(12) United States Patent
Asada et al.

(10) Patent No.: US 7,238,935 B2
(45) Date of Patent: Jul. 3, 2007

(54) LIGHT DETECTION DEVICE

(75) Inventors: Kenichi Asada, Tokyo (JP); Kenjiro Hamanaka, Tokyo (JP); Masahiro Oikawa, Tokyo (JP); Kenichi Nakama, Tokyo (JP)

(73) Assignee: Nippon Sheet Glass Co., Ltd. (JP)

( * ) Notice: Subject to any disclaimer, the term of this patent is extended or adjusted under 35 U.S.C. 154(b) by 126 days.

(21) Appl. No.: 11/234,748

(22) Filed: Sep. 23, 2005

(65) Prior Publication Data

US 2006/0065817 A1    Mar. 30, 2006

(30) Foreign Application Priority Data

| Sep. 24, 2004 | (JP) | ............................. 2004-277520 |
| Oct. 7, 2004 | (JP) | ............................. 2004-295222 |
| Oct. 7, 2004 | (JP) | ............................. 2004-295223 |
| Oct. 7, 2004 | (JP) | ............................. 2004-295224 |
| Apr. 19, 2005 | (JP) | ............................. 2005-121496 |

(51) Int. Cl.
*H01J 3/14* (2006.01)

(52) U.S. Cl. ...................... 250/234; 250/216; 250/239; 356/150; 398/20

(58) Field of Classification Search ................ 250/234, 250/235, 239, 227.11, 370.1, 370.08; 385/12, 385/13, 17–19; 398/9, 20, 28; 356/150
See application file for complete search history.

(56) References Cited

U.S. PATENT DOCUMENTS 6,828,540 B2 * 12/2004 Landolt .................... 250/208.1
7,129,472 B1 * 10/2006 Okawa et al. ............... 250/234

FOREIGN PATENT DOCUMENTS

JP    05-023847    8/1994

* cited by examiner

*Primary Examiner*—Thanh X. Luu
*Assistant Examiner*—Stephen Yam
(74) *Attorney, Agent, or Firm*—Sheridan Ross P.C.

(57) ABSTRACT

A light detection device for detecting an optical path position of invisible light. The detection device includes a main body and a light guide. The light guide includes a distal end functioning as a light incident portion through which the detected light enters and a light radiation portion from which visible light is emitted. A drive mechanism reciprocates the light guide in an X-direction while vibrating the light guide in a perpendicular Y-direction. The distal end of the light guide rod moves within a light detection area in an XY plane. A visible light-emitting unit radiates visible light from the distal end when the detected light enters the distal end. The visible light-emitting unit includes a photo-detector for detecting the detected light and a light-emitting element for generating the visible light when the photo-detector detects the detected light.

30 Claims, 24 Drawing Sheets

LIGHT DETECTION DEVICE

CROSS-REFERENCE TO RELATED APPLICATIONS

This application is based upon and claims the benefit of priority from prior Japanese Patent Application No. 2004-277520, filed on Sep. 24, 2004, Japanese Patent Application Nos. 2004-295222, 2004-295223, and 2004-295224, filed on Oct. 7, 2004, and Japanese Patent Application No. 2005-121496, filed on Apr. 19, 2005, the entire contents of which are incorporated herein by reference.

BACKGROUND OF THE INVENTION

The present invention relates to a light detection device for detecting invisible light, such as infrared light.

Infrared light, which has a longer wavelength than visible light, is used in optical communications. Since infrared light is invisible, one cannot visually identify the optical path of an infrared signal output from an end of an optical fiber cable.

Optical elements (e.g., diffraction gratings, mirrors, etc.) used in optical communications modules are inspected using infrared light. In detail, an optical element is fixed to a sample stage. Infrared light for inspection is output from one end of an optical fiber cable to irradiated the optical element. The optical element is evaluated based on reflected light from the optical element. To enable precise irradiation of the optical element with infrared light, the optical path position of the infrared light is first detected and then aligned with the optical element. The intensity of infrared light, which is output from an infrared light source, is generally maximum at the center of its optical path and becomes weaker at positions farther from the center. To irradiate the optical element with the strongest portion of the infrared light, the operator must detect the effective spot diameter of the infrared light including the center of its optical path.

To detect the effective spot diameter, infrared light detection devices, such as an infrared (IR) card, an infrared charge coupled device (CCD) camera, and an optical power meter, may be used.

The IR card has a surface on which a light-emitting area is formed by applying a light-emitting material. When subjected to infrared light, the light-emitting material emits visible light having an intensity according to the intensity of the infrared light. The operator visually identifies the visible light to detect the optical path of the infrared light.

The infrared CCD camera directly receives infrared light and displays the infrared light on its display unit. With the infrared CCD camera, the operator is able to detect the intensity distribution of infrared light with high sensitivity.

The optical power meter includes a sensor for receiving infrared light and a meter for displaying the intensity of the infrared light. The operator moves the sensor to receive infrared light with the maximum intensity so that the optical path of the infrared light can be identified.

Japanese Laid-Open Patent Publication No. 6-236574 describes a method for detecting an optical path position using an optical power meter. A sensor included in the optical power meter has four photo-detectors. When a two-channel oscilloscope receives an input of a first difference, which is the difference between the outputs of two photo-detectors into its X axis, and an input of a second difference, which is the difference between the outputs of the other two photo-detectors into its Y axis, the oscilloscope displays a bright spot on its CRT (cathode-ray tube). The operator identifies the optical path position based on the display position of the bright spot and adjusts the position of the sensor accordingly.

The IR card has low sensitivity and does not have a sensitization function. To enable the IR card to detect weak infrared light, the entire working environment needs to be darkened. In this case, the room in which inspections are performed needs to be darkened first for the operator to identify the optical path position of light. Then, the room needs to be lightened for the operator to adjust the position of the optical element. Thus, the setting of the working environment is burdensome. Further, since the IR card has low sensitivity, the operator cannot accurately identify the effective spot diameter. Moreover, the infrared CCD camera is relatively large and is not suitable for infrared light detection performed in a narrow space.

The optical power meter described in Japanese Laid-Open Patent Publication No. 6-236574, which is used to detect the optical path position, requires the operator to look at the CRT and adjust the position of the sensor. The operator needs to frequently look from one place to another. Thus, identification of the optical path position with this optical power meter takes a long time.

The IR card, the infrared CCD camera, and the optical power meter all require the optical element to be rearranged with respect to the detected optical path position after the optical path position is detected. Thus, precise irradiation of the optical element with infrared light using the IR card, the infrared CCD camera, and the optical power meter is difficult.

SUMMARY OF THE INVENTION

It is an object of the present invention to provide a light detection device that has improved resolution and detects an optical path position of invisible light, such as infrared light.

One aspect of the present invention is a light detection device for detecting detected light. The light detection device includes a main body. A light guide is supported by the main body in a manner enabling the light guide to vibrate. The light guide includes a distal end projecting from one side surface of the main body. The distal end functions as a light incident portion through which the detected light enters and a light radiation portion from which visible light is emitted. A drive mechanism, arranged in the main body, reciprocates the light guide in an X-direction while vibrating the light guide in a Y-direction that is perpendicular to the X-direction. The distal end of the light guide moves within a light detection area in an XY plane. A visible light-emitting unit, arranged in the main body, emits visible light from the distal end of the light guide when the detected light enters the distal end. The visible light-emitting unit includes a photo-detector, optically coupled to the light guide, for detecting the detected light from the light guide. A light-emitting element generates the visible light when the photo-detector detects the detected light.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A light detection device for detecting invisible light according to a first embodiment of the present invention will now be described with reference to FIGS. 1 to 8. The light detection device of the first embodiment is an infrared light detection device 1 for detecting infrared light.

Figure 1:
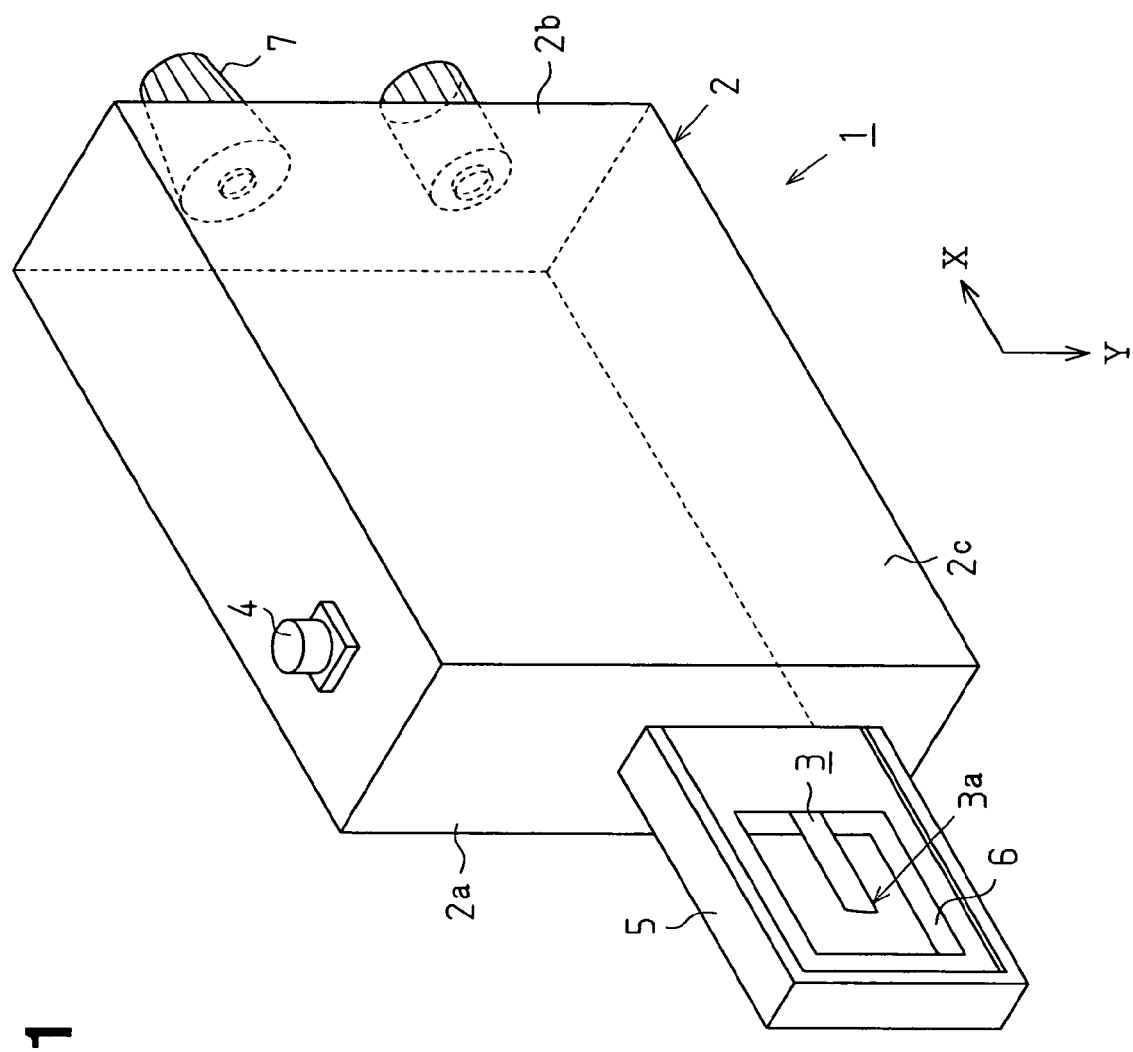
FIG. 1 is a schematic diagram of an infrared light detection device according to a first embodiment of the present invention.
Figure 2:
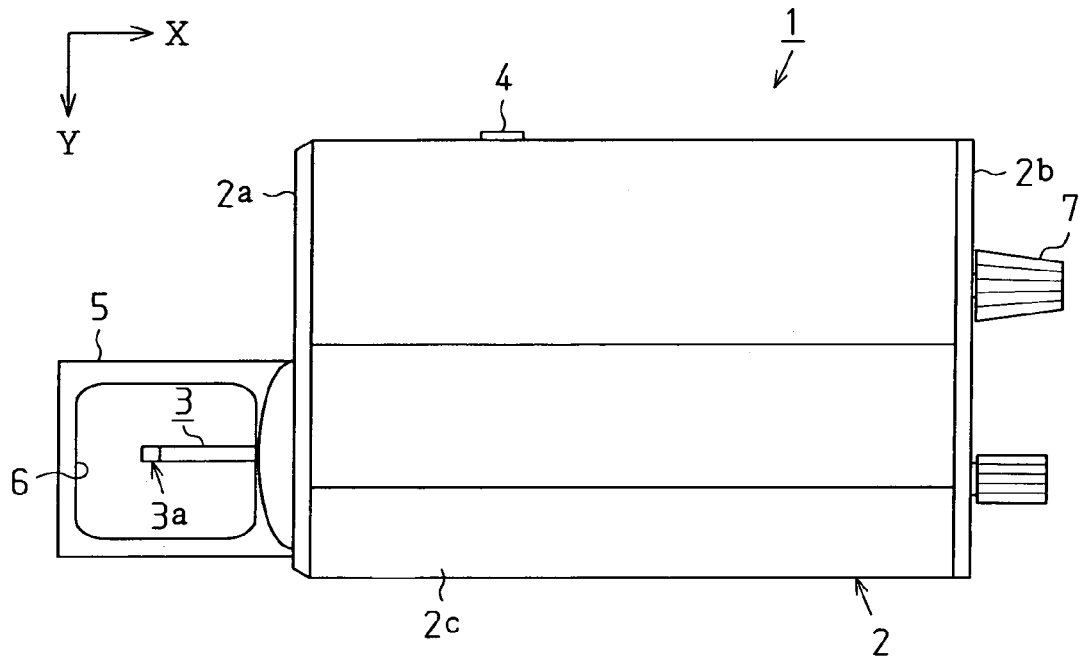
FIG. 2 is a side view of the infrared light detection device of FIG. 1.

As shown in FIGS. 1 and 2, the infrared light detection device 1 includes a main body 2 and a light guide rod 3. The light guide rod 3 is made of glass. The light guide rod 3 is supported on the main body 2. The light guide rod 3 has a distal end 3a, which projects from the left side surface 2a of the main body 2. The distal end 3a functions as a light incident portion and a light radiation portion. The distal end 3a of the light guide rod 3 projects from the left side surface 2a of the main body 2. The distal end 3a of the light guide rod 3 is driven in two directions, that is, the X-direction and the Y-direction (refer to FIG. 5).

The main body 2 is shaped as a rectangular box. The main body 2 has, for example, a length of 90 mm, a thickness of 23 mm, and a height of 58 mm. The main body 2 is compact so that it can be held in an operator's hand. The light guide rod 3 is an optical fiber having, for example, an outer diameter of 500 μm.

A switch 4, such as a button switch, is arranged on the upper portion of the main body 2. The switch 4 is operated to start vibration, to stop vibration, and to change vibration speed (vibration frequency in the X-direction). By operating the switch 4, the vibration speed (vibration frequency in the X-direction) of the light guide rod 3 is switched between three levels, that is, low, medium, and high.

A protection case 5 for protecting the distal end 3a of the light guide rod 3 is fixed to the left side surface 2a of the main body 2. The protection case 5 has a square window 6. The window 6 is covered by, for example, glass plates. The window 6 allows the distal end 3a of the light guide rod 3 to be viewable.

A sensitivity adjustment knob 7 is arranged on the right side surface 2b of the main body 2. The sensitivity adjustment knob 7 allows manual adjustment of the detection sensitivity. Magnets 8 (refer to FIG. 3) for removably holding a lid 2c is arranged on the main body 2.

Figure 3:
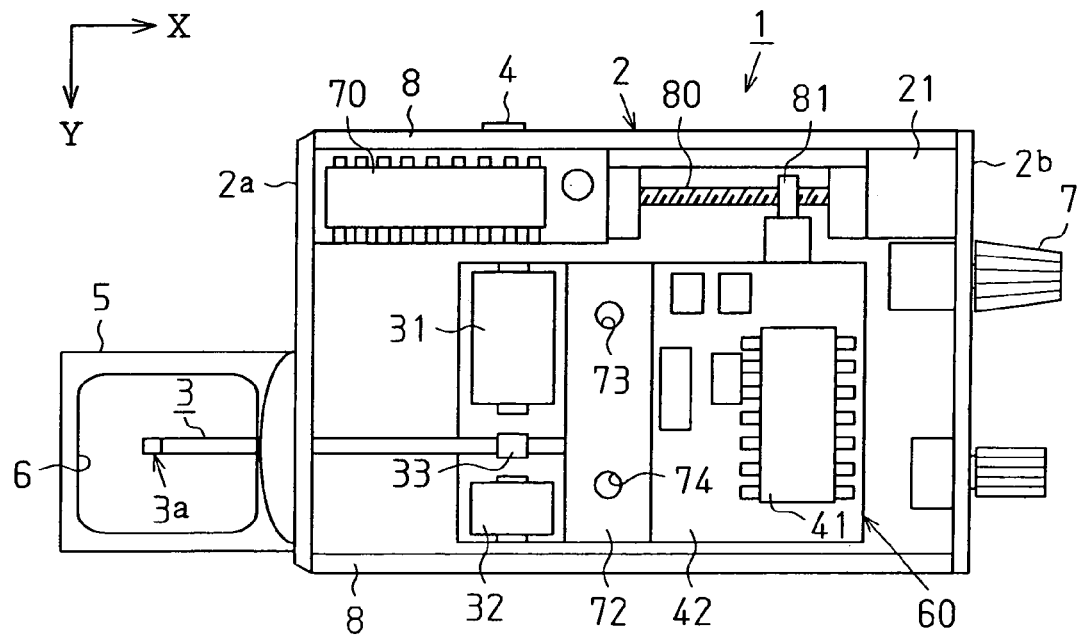
FIG. 3 is a side view of the infrared light detection device of FIG. 1 showing its internal structure.

As shown in FIG. 3, a stepping motor 21 and a drive coil 31 are arranged in the main body 2. The stepping motor 21 is included in an X-direction drive system, which drives the light guide rod 3 in the X-direction. The drive coil 31 is included in a Y-direction vibration drive system, which electromagnetically drives the light guide rod 3 in the Y-direction.

A circuit board 42 is fixed to a lower middle portion of the main body 2. Various electronic circuits including an analog signal processing circuit 41, which functions as a light detection circuit, are formed on the circuit board 42. An optical system 50 (refer to FIG. 6) is arranged under the circuit board 42. The analog signal processing circuit 41 and the optical system 50 are integrated into a single module 60.

A controller 70 is arranged in an upper left portion of the main body 2. The controller 70 executes variable speed control for switching the vibration speed (vibration frequency in the X-direction) of the light guide rod 3, and vibration start/stop control. The controller 70 is, for example, a one-chip microcomputer including an A/D converter, a CPU for executing various arithmetic operations, a ROM for storing various control programs, and a RAM for storing various data.

The switch 4 is pushed so that the light guide rod 3 starts vibrating in the Y-direction with its basal end serving as a fulcrum. After one second from the start of the vibration, the light guide rod 3 also starts reciprocating in the X-direction. Whenever the switch 4 is pushed in this state, the vibration frequency (vibration speed) of the light guide rod 3 in the X-direction is switched between three levels, that is, low, medium, and high. More specifically, the vibration frequency (vibration speed) of the light guide rod 3 in the X-direction is switched from low to medium and then high whenever the switch 4 is pushed. Then, the switch 4 is pushed further, so that the light guide rod 3 stops both its vibration in the Y-direction and its reciprocation in the X-direction.

Lowering of the vibration speed of the light guide rod 3 in the X-direction enables the infrared light detection device 1 to easily detect infrared light having a small optical path diameter. In other words, the lowering of the vibration speed of the light guide rod 3 in the X-direction enables the infrared light detection device 1 to have improved detection resolution of infrared light.

Table 1 shows the scan performance (scan function) of the distal end 3a of the light guide rod 3 in the X-direction at various vibration speeds (vibration frequencies). The distal end 3a of the light guide rod 3 moves within a light detection area 10 (refer to FIG. 5) on an XY plane. The light detection area 10 has a size of about 15×15 mm. The distal end 3a of the light guide rod 3 is moved in the Y-direction by about 15 mm and in the X-direction by about 15 mm.

TABLE 1

| Vibration Speed in X-direction | Scan Time for One Frame (msec) | Number of Scan Lines 11 | Scan Line Pitch (mm) |
| --- | --- | --- | --- |
| High | 179 | 36 | about 0.4 |
| Medium | 230 | 46 | about 0.32 |
| Low | 280 | 56 | about 0.27 |

In Table 1, the "scan time for one frame" is the time required by the distal end 3a of the light guide rod 3 to scan the entire light detection area 10 (one frame) once. The "number of scan lines" is the total number of scan lines 11 generated in the light detection area 10. One scan line 11 is defined as the locus of one-way movement of the distal end 3a in the Y-direction. The "scan line pitch" is a value obtained by dividing the distance by which the distal end 3a is moved in the X-direction (about 15 mm) by the number of scan lines 11.

As shown in Table 1, the scan line pitch of the distal end 3a of the light guide rod 3 decreases as the vibration speed of the light guide rod 3 in the X-direction decreases. In other words, the scan lines generated by the distal end 3a of the light guide rod 3 are denser as the vibration speed of the light guide rod 3 in the X-direction decreases. Thus, lowering the vibration speed of the light guide rod 3 in the X-direction enables the infrared light detection device 1 to have improved detection resolution and enables infrared light having a smaller optical path diameter to be detected.

Figure 4A:
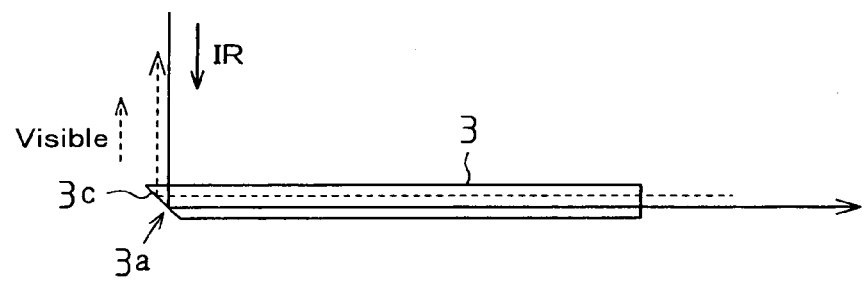
FIG. 4(a) is a plan view of a light guide rod.
Figure 4B:
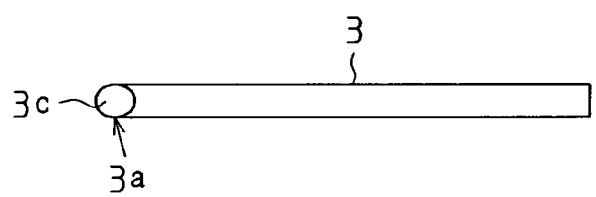
FIG. 4(b) is a side view of the light guide rod.
Figure 5:
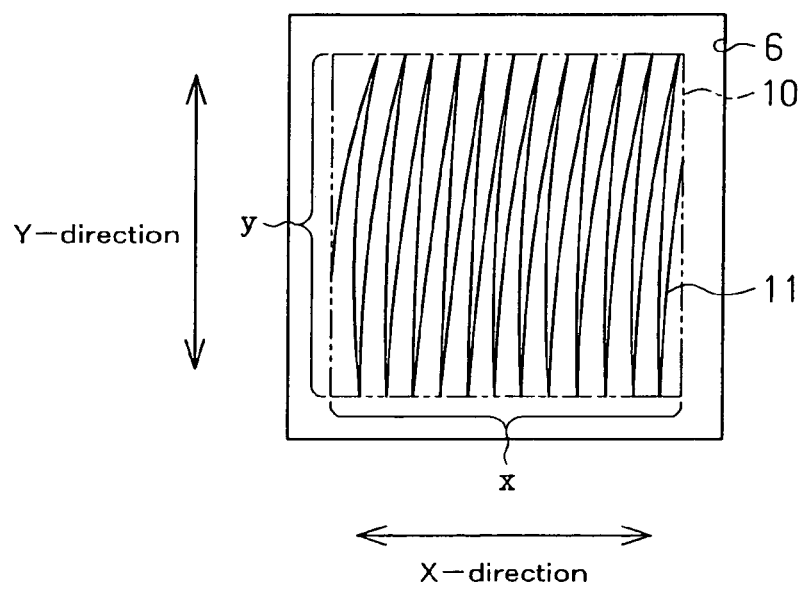
FIG. 5 is a plan view of a light detection area that is scanned by a distal end of the light guide rod.

FIGS. 4(a) and 4(b) show one example of the light guide rod 3. The light guide rod 3 is a typical optical fiber, which includes a core and a clad. The light guide rod 3 has an outer diameter of 500 μm. The distal end 3a of the light guide rod 3 has a polished surface 3c, which is inclined at an angle of 45 degrees with respect to the core axis (optical axis) of the optical fiber.

As shown in FIG. 4(a), infrared light that is incident on the distal end 3a at an angle of 45 degrees with respect to the core axis (optical axis) of the optical fiber is reflected by the polished surface 3c and directed into the light guide rod 3. The infrared light travels through the light guide rod 3 to its basal end 3b (refer to FIG. 6). Incident light (e.g., orange visible light) that is incident on the basal end 3b of the light guide rod 3 travels along the light guide rod 3 to its distal end 3a. The light is then reflected by the polished surface 3c and output at an angle of 45 degrees with respect to the core axis as indicated by the broken line in FIG. 4(a).

The light guide rod 3 can be a flexible optical fiber. For example, an optical fiber having a large Young's modulus and a tolerable flexing radius of 33 mm can be useable. When the optical fiber is 55 mm in length, the optical fiber has a maximum flexure of 10 mm.

Figure 6:
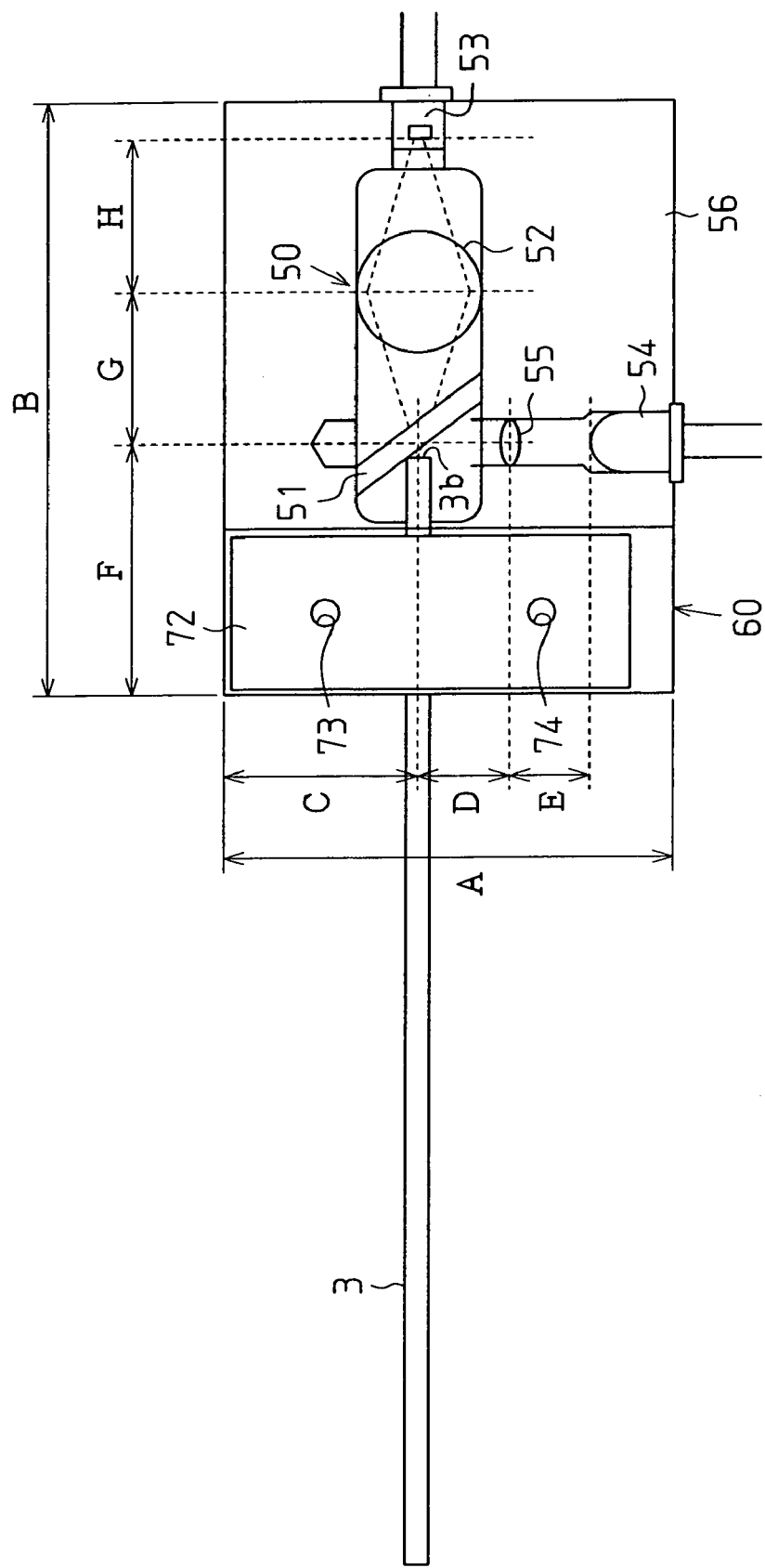
FIG. 6 is a plan view of an optical system of the infrared light detection device of FIG. 1.

As shown in FIG. 6, the optical system 50 includes the light guide rod 3, a mirror surface Si substrate 51, a spherical lens 52, a photo-detector 53, a light-emitting diode 54, and a focusing lens 55. The mirror surface Si substrate 51 functions as an infrared transmissive filter. The spherical lens 52 focuses infrared light that has been transmitted through the mirror surface Si substrate 51. The light-emitting diode 54 functions as a light-emitting element. The optical system 50 directs detected light, or infrared light, which is incident on the distal end 3a of the light guide rod 3, toward the photo-detector 53. The optical system 50 also directs visible light that is generated by the light-emitting diode 54 toward the basal end 3b of the light guide rod 3.

The optical elements of the optical system 50 are arranged on an optical system substrate 56, which is fixed integrally with the circuit board 42.

The mirror surface Si substrate 51 has, for example, a transmittance of 70% for light having a wavelength of 1550 nm. The spherical lens 52 is, for example, a Ø7 mm spherical lens. The photo-detector 53 is, for example, a Ø1 mm InGaAs photo-detector.

For the reasons described below, it is preferable that the light-emitting diode 54 be a light-emitting diode that emits visible light having a peak wavelength in a range of 590 to 620 nm. One example of such a light-emitting diode is an orange light-emitting diode that emits visible light having a peak wavelength of 610 nm (orange).

The operator usually wears protective glasses for shielding laser light when performing fine alignment operations such as optical axis alignment in the assembly of optical communications modules using the infrared light detection device 1. The infrared light detection device 1 is used to detect infrared light output, for example, from a laser light source. Examples of optical communications modules include an optical fiber collimator, a multiplexer, and a splitter. The typical protective glasses transmit light having wavelengths ranging from 590 to 620 nm. When visible light emitted from the light-emitting diode 54 has a peak wavelength in a range of 590 to 620 nm, the operator wearing the protective glasses is able to visually identify the emitted visible light using the infrared light detection device 1.

When visible light emitted from the light-emitting diode 54 has a peak wavelength shorter than 590 nm, the operator wearing the typical protective glasses would not be able to visually identify the visible light. When visible light emitted from the light-emitting diode 54 has a wavelength longer than 620 nm, the operator wearing the typical protective glasses would not be able to visually identify the visible light.

Figure 7:
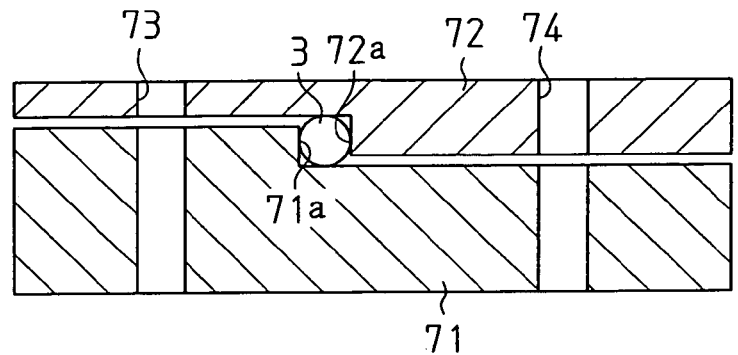
FIG. 7 is a cross-sectional view of a light guide rod fixing part included in the infrared light detection device of FIG. 6.
Figure 8:
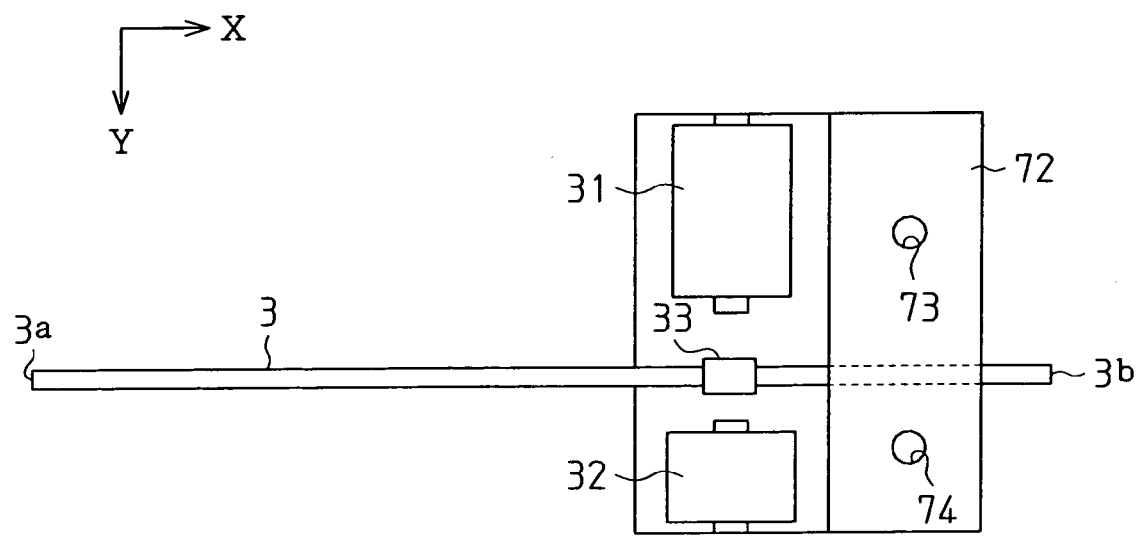
FIG. 8 is a plan view schematically showing the structure of a Y-direction vibration drive system.

As shown in FIGS. 7 and 8, the basal end 3b of the light guide rod 3 is held between a step 71a of a base 71 and a step 72a of a base 72. The bases 71 and 72 that hold the basal end 3b of the light guide rod 3 are respectively fixed to the optical system substrate 56 and the circuit board 42 by nuts and bolts, which are inserted through-holes 73 and 74. As a result, the electronic circuits and the optical system 50 are integrated into the single module 60. The module 60 reciprocates in the X-direction together with the light guide rod 3. The bases 71 and 72 are formed by cutting aluminum blocks into the corresponding shapes. The bases 71 and 72 are light so as to reduce the inertial mass of the module 60.

Infrared light emitted from the basal end 3b of the light guide rod 3 is transmitted through the mirror surface Si substrate 51, focused by the spherical lens 52, and sent to the photo-detector 53, in which the incident light is subjected to photoelectric conversion. The detection signal (output current) of the photo-detector 53 is amplified. The amplified signal drives the light-emitting diode 54 to emit visible light (orange). The visible light is focused by the focusing lens 55, sent to the mirror surface Si substrate 51, reflected by the mirror surface Si substrate 51, and sent to the basal end 3b of the light guide rod 3. The visible light travels along the light guide rod 3 to its distal end 3a and is then reflected by the polished surface 3c and output from the distal end 3a in a direction perpendicular to the core axis.

The analog signal processing circuit 41 generates, for example, a comparison voltage in accordance with the output current of the photo-detector 53, holds a peak voltage of the comparison voltage, and generates a reference voltage in accordance with the peak voltage. The analog signal processing circuit 41 generates and outputs an illumination signal when the comparison voltage exceeds the reference voltage. A transistor that is connected in series to the light-emitting diode 54 becomes conductive in response to the illumination signal output from the analog signal processing circuit 41. As a result, drive current flows through the light-emitting diode 54 so that the light-emitting diode 54 emits orange visible light.

The optical system 50 has, for example, dimensions A to H shown in FIG. 6. More specifically, the optical system 50 has dimensions A of 28.5 mm, B of 34 mm, C of 10 mm, D of 5.5 mm, E of 5.5 mm, F of 15 mm, G of 8.5 mm, and H of 8.5 mm.

The Y-direction vibration drive system drives the light guide rod 3 to vibrate (swing) in the Y-direction with its basal end 3b serving as a fulcrum so that the distal end 3a moves in the Y-direction. The Y-direction vibration drive system electromagnetically drives the light guide rod 3 using the drive coil 31. The light guide rod 3 is a cantilevered vibrating body. Thus, the Y-direction vibration drive system is short in the longitudinal direction of the light guide rod 3 and is thus compact.

As shown in FIGS. 3 and 8, the Y-direction vibration drive system includes the drive coil 31, a feedback coil 32, and a permanent magnet 33. The permanent magnet 33 is attached to the light guide rod 3 and is arranged between the coils 31 and 32. For example, the upper surface of the permanent magnet 33 may function as the north pole, and the lower surface of the permanent magnet 33 may function as the south pole. The magnetic poles of the drive coil 31 are switched by changing the direction of the drive current that flows through the drive coil 31. The switching of the magnetic poles of the drive coil 31 causes the light guide rod 3 to vibrate (swing) in the Y-direction with its basal end 3b serving as a fulcrum.

The drive coil 31 is formed by winding a Ø0.1 mm enamel wire for 1200 turns. The drive coil 31 with such a structure reliably drives the permanent magnet 33 without having to excessively increase the drive current of a 5V power supply. The feedback coil 32 following the vibration frequency is formed by winding a Ø0.05 mm enamel wire for 1300 turns. The Y-direction vibration drive system causes the light guide rod 3 to vibrate in the Y-direction at, for example, a vibration frequency of 100 Hz.

The X-direction drive system causes the module 60 to reciprocate (vibrate) in the X-direction together with the light guide rod 3. As shown in FIG. 3, the X-direction drive system includes the stepping motor 21, which is connected to a screw mechanism. The screw mechanism includes a screw axis 80 and a screw-operated slider 81. The stepping motor 21 rotates the screw axis 80. The slider 81 is mated with the screw axis 80. The slider 81 is fixed to the module 60. In accordance with the rotation direction of the screw axis 80, the slider 81 linearly reciprocates in the X-direction. The module 60 linearly reciprocates in the X-direction together with the light guide rod 3.

The screw axis 80 and the slider 81 convert the rotation of the stepping motor 21 into linear motion. The X-direction drive system moves the module 60 and the light guide rod 3 with a large torque. However, since the rotation speed of the stepping motor 21 is increased to obtain the desired vibration speed (vibration frequency) of the light guide rod 3 in the X-direction, the X-direction drive system is disadvantageous in terms of rotation torque. However, experiments reveal that the X-direction drive system produces a rotation torque of 0.2 mN·m, which is one-fourth of a maximum generation torque, for the maximum set pulse rate of 889 PPS. Further, the acceleration/deceleration control (driving in a trapezoidal form) prevents the stepping motor 21 from being stepped out, and enables stable driving of the stepping motor 21.

The method for using the infrared light detection device 1 will now be described.

The infrared light detection device 1 may be used to detect the optical path position of infrared light, which is output from a laser light source, during optical axis alignment of an optical communications module, such as an optical fiber collimator, a multiplexer, and a splitter. First, the light detection area 10 is arranged between the laser light source and the optical communications module. In this state, the switch 4 is operated to start vibration of the light guide rod 3 in the Y-direction and to start reciprocation of the light guide rod 3 in the X-direction. As a result, the distal end 3a of the light guide rod 3 repeatedly scans the light detection area 10 during the scan time for one frame shown in Table 1.

When infrared light (infrared rays) enters the distal end 3a as indicated by the solid line arrow in FIG. 4(a) while the distal end 3a of the light guide rod 3 is scanning the light detection area 10, the infrared light is reflected by the polished surface 3c to travel along the light guide rod 3 to its basal end 3b. Infrared light emitted from the basal end 3b of the light guide rod 3 is transmitted through the mirror surface Si substrate 51, focused by the spherical lens 52, and is sent to the photo-detector 53, in which the incident light is subjected to photoelectric conversion. The detection signal (output current) of the photo-detector 53 is amplified. The light-emitting diode 54 is driven in accordance with the amplified signal. As a result, the light-emitting diode 54 emits visible light (orange). The visible light is focused by the focusing lens 55, sent to the mirror surface Si substrate 51. The light is then reflected by the mirror surface Si substrate 51 and sent to the basal end 3b of the light guide rod 3. The visible light travels along the light guide rod 3 to its distal end 3a and is then reflected by the polished surface 3c and output from the distal end 3a in a direction perpendicular to the core axis. As a result, the position of the invisible infrared light in the light detection area 10 is displayed as an afterimage of the visible light output from the distal end 3a. The operator is able to visually identify the optical path position and the optical path diameter of the infrared light.

The X-direction drive system and the Y-direction vibration drive system function as a drive mechanism for driving the light guide rod 3. The drive mechanism and the optical system 50 function as a visible light-emitting unit.

The first embodiment has the advantages described below.

The light-emitting diode 54 emits visible light (orange) when infrared light enters the distal end 3a and the photo-detector 53 detects the infrared light while the distal end 3a of the light guide rod 3 is repeatedly scanning the light detection area 10. The emitted visible light is output from the distal end 3a of the light guide rod 3. The position of the infrared light in the light detection area 10 is displayed as an afterimage of the visible light (orange). With the infrared light detection device 1, the operator is able to visually identify the optical path position and the optical path diameter of the infrared light.

The infrared light detection device 1, which detects infrared light from a laser light source, enables infrared light from a laser light source to be used in the optical axis alignment of optical communications modules, such as an optical fiber collimator, a multiplexer, and a splitter. As a result, the optical axis alignment is efficiently performed.

The light guide rod 3 is an optical fiber that outputs visible light, which is emitted from the light-emitting diode 54, from its distal end 3a. While vibrating, the light guide rod 3 outputs visible light with small diffusion. This produces an afterimage of light as a bright spot in a manner as if it was obtained using a point light source. As a result, the infrared light detection device 1 detects invisible light, such as infrared light, with high detection resolution (display resolution).

The mass of the light guide rod 3 is small. Further, the distal end 3a of the light guide rod 3 includes the inclined polished surface 3c. The inclined polished surface 3c of the distal end 3a further reduces the weight of the light guide rod 3. This makes it easy to increase the vibration frequency (vibration frequency in the Y-direction) of the light guide rod 3. As a result, the infrared light detection device 1 has further improved detection resolution of infrared light (display resolution).

A light source or a light-emitting unit does not need to be additionally arranged on the distal end of the light guide rod 3. Thus, the light guide rod 3 does not need electric wiring and no electric failure occurs in the light guide rod 3. This enables the infrared light detection device 1 to be used for a long period of time while maintaining high reliability.

Fatigue breakage resulting from vibrations is less in glass than in a metal. The light guide rod 3, which is formed by an optical fiber, is thus less likely to be damaged by fatigue. This enables the infrared light detection device 1 to be used for a long period of time while maintaining high reliability.

The components, such as the photo-detector, the light-emitting element, and the electric wiring, are not mounted on the light guide rod 3. Thus, it is easy to mount the light guide rod 3 and assemble the infrared light detection device 1. The infrared light detection device 1 is suitable for mass production.

The light guide rod 3 is cantilevered. This enables the size of the infrared light detection device 1 to be reduced in the longitudinal direction of the light guide rod 3.

The Y-direction vibration drive system electromagnetically drives the light guide rod 3 to vibrate in the Y-direction, and the X-direction drive system drives the light guide rod 3 to reciprocate in the X-direction. This enables the distal end 3a of the light guide rod 3 to repeatedly scan the light detection area 10.

The X-direction drive system includes the stepping motor 21, which rotates the screw axis 80. The stepping motor 21 has a larger drive torque than a linear stepping motor. Thus, even when the infrared light detection device 1 is arranged so that the X-direction coincides with the vertical direction, the light guide rod 3 vibrates in the X-direction. The range of the conditions under which the infrared light detection device 1 may be used is wide. Thus, the infrared light detection device 1 is easy to use.

The photo-detector 53 and the light-emitting diode 54 are optically coupled to the light guide rod 3. The photo-detector 53 and the light-emitting diode 54 are electrically connected to the analog signal processing circuit 41. Thus, components such as the photo-detector and the light-emitting element do not need to be mounted on the distal end 3a of the light guide rod 3. Further, the photo-detector and the light-emitting element do not need to be electrically connected to the light guide rod 3.

The optical system 50 and the electronic circuits are integrated into the module 60. Thus, it is easy to assemble the infrared light detection device 1. The infrared light detection device 1 is suitable for mass production.

The bases 71 and 72, which hold the basal end 3b of the light guide rod 3, are light. Thus, the inertial mass of the module 60, which is driven in the X-direction together with the light guide rod 3, is reduced.

The drive mechanism and the visible light-emitting unit are accommodated in the main body 2. The lid 2c of the main body 2 is removably held by the magnets 8. Thus, it is easy to install the drive mechanism and the visible light-emitting unit into the main body 2.

The light-emitting diode 54 emits visible light having a peak wavelength in a range of 590 to 620 nm. The operator wearing typical protective glasses (that transmit light with wavelengths ranging from 590 to 620 nm) is able to visually identify whether the infrared light detection device 1 has emitted visible light without removing the protective glasses.

An infrared light detection device 1 according to a second embodiment of the present invention will now be described with reference to FIGS. 9 to 20.

Figure 9:
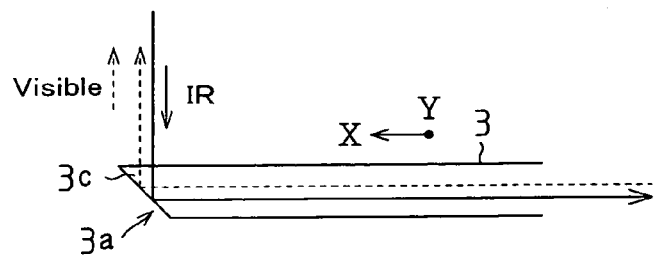
FIG. 9 is an enlarged view of the light guide rod of FIG. 4.
Figure 10A:
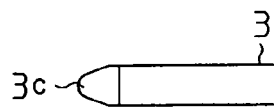
FIG. 10(a) is a plan view of the light guide rod of FIG. 9.
Figure 10B:
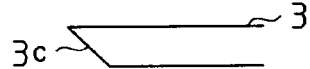
FIG. 10(b) is a side view of the light guide rod.
Figure 10C:
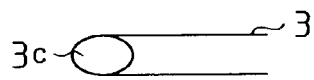
FIG. 10(c) is a bottom view of the light guide rod.

The infrared light detection device 1 of the first embodiment uses the light guide rod 3 shown in FIG. 9. The distal end 3a of the light guide rod 3 includes the polished surface 3c that is inclined at an angle of 45 degrees with respect to the core axis (optical axis). The polished surface 3c enables infrared light, which functions as detected light, to enter the distal end 3a in a direction perpendicular to the XY plane (XY scan surface) and visible light to be output from the distal end 3a in a direction perpendicular to the XY plane. FIG. 10(a) shows the polished surface 3c as viewed from above the light guide rod 3. FIG. 10(b) shows the polished surface 3c as viewed from the side of the light guide rod 3. FIG. 10(c) shows the polished surface 3c as viewed from below the light guide rod 3.

As described above, infrared light that enters the distal end 3a of the light guide rod 3 in a direction perpendicular to the core axis is reflected by the polished surface 3c, travels along the light guide rod 3 to its basal end 3b, and is output from the basal end 3b. The infrared light output from the basal end 3b enters the photo-detector 53, which converts the light into an electric signal. The electric signal resulting from the conversion (output current of the photo-detector 53) drives the light-emitting diode 54. As a result, the light-emitting diode 54 emits visible light (orange). The visible light enters the basal end 3b of the light guide rod 3, travels along the light guide rod 3 to its distal end 3a, and is reflected by the polished surface 3c. As a result, the visible light is output from the distal end 3a in a direction perpendicular to the core axis.

In the infrared light detection device 1 of the first embodiment, if infrared light is received in a direction that even slightly differs from the direction indicated by the solid line arrow in FIG. 9, the light-receiving efficiency of the photo-detector 53 for receiving infrared light drastically decreases. In addition to such decrease in the light-receiving efficiency, the intensity of visible light that is emitted from the light-emitting diode 54 decreases accordingly.

Figure 11:
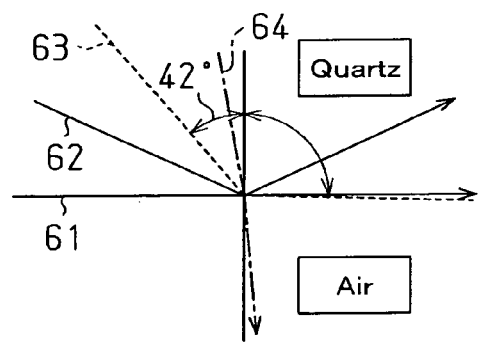
FIG. 11 is a diagram describing a critical angle at an interface between air and quartz.

This phenomenon can be explained by the influence of a critical angle at an interface 61 between air and the light guide rod 3 (quartz) as shown in FIG. 11. When the refractive index of air is 1 and the refractive index of the light guide rod 3 (quartz) is 1.5, the critical angle at the interface therebetween is about 42 degrees. Incident light 62 having an incident angle greater than the critical angle is reflected by the interface 61. Incident light 63 and incident light 64 having incident angles smaller than or equal to the critical angle are not reflected on the interface 61 but are transmitted through the interface 61.

Figure 12:
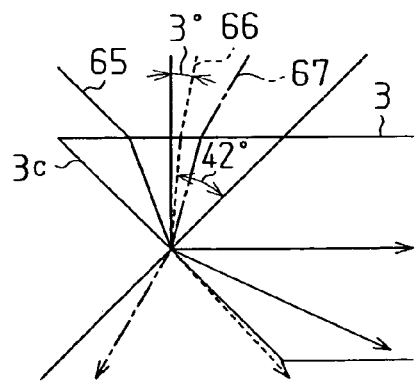
FIG. 12 is a diagram describing a critical angle at a polished surface of the light guide rod made of glass.

The same explanation applies to the 45° inclined polished surface 3c of the light guide rod 3. As shown in FIG. 12, infrared light partially enters the polished surface 3c in a direction that is at an angle of 3 degrees or more to the right with respect to an incident direction 65 that is perpendicular to the core axis of the light guide rod 3. In this case, those portions of the infrared light are not reflected by the polished surface 3c but are transmitted through the polished surface 3c as indicated by the broken line arrow 66 and single-dot arrow 67. As a result, the amount of light received by the photo-detector 53 decreases as compared with when the received light is entirely reflected by the polished surface 3c and entirely directed into the light guide rod 3.

Figure 13:
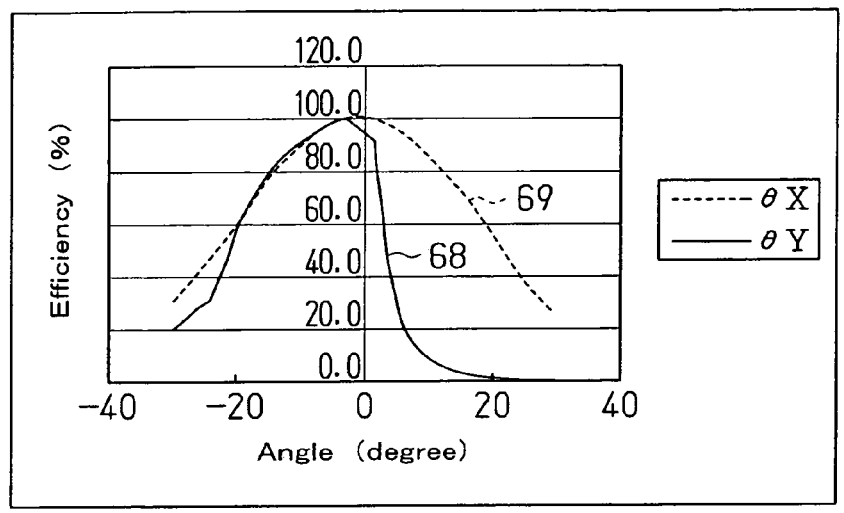
FIG. 13 is a graph showing the relationship between the incident angle and the light-receiving efficiency.
Figure 14A:
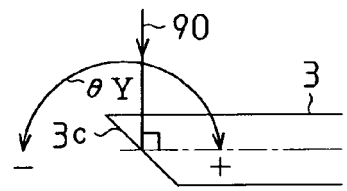
FIGS. 14(a) and 14(b) are diagrams describing angles θY and θX shown in FIG. 13.
Figure 14B:
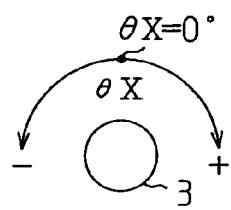

FIG. 13 shows the measurement results for the light-receiving efficiency change as the incident angle of infrared light is changed.

In FIG. 13, the solid line curve 68 indicates the light-receiving efficiency change as the angle θY is changed, and the broken line curve 69 indicates the light-receiving efficiency change as the angle θX is changed. The angle θY is the angle of rotation of incident light flux 90 around the Y axis with respect to the light guide rod 3. The angle θY is 0° when infrared light (incident light flux 90) is received by the 45° inclined polished surface 3c in a direction perpendicular to the core axis. The angle θY is a positive value (+) when the incident light flux 90 is received at an angle smaller than 90° with respect to the core axis, and is a negative value (−) when the incident light flux 90 is received at an angle greater than 90° with respect to the core axis. The incident light flux 90 lies along a plane that includes the core axis of the light guide rod 3 and is perpendicular to the 45° inclined polished surface 3c (θX=0°).

The angle θX is the angle of rotation of the incident light flux 90 around the X axis with respect to the light guide rod 3. In detail, the angle θX is the incident angle of the incident light flux 90 with respect to the plane that includes the core axis of the light guide rod 3 and is perpendicular to the 45° inclined polished surface 3c (plane of FIG. 14(a)) when the angle θY is 0° (refer to FIG. 14(b)).

Referring to FIG. 13, the infrared light is transmitted through the polished surface 3c when the angle θY is −3° or more. In this case, the light-receiving efficiency of the photo-detector 53 for receiving infrared light decreases drastically. Further, the intensity of visible light that is emitted from the light-emitting diode 54 decreases accordingly.

The graph shown in FIG. 13 shows the measurement results for the current output of the photo-detector 53. The measured current outputs for the photo-detector 53 correspond to various incident angles (incident angles with respect to the XY plane) of incident light (infrared light) on the 45° inclined polished surface 3c of the light guide rod 3. In the measurement system, the light emitted from the basal end 3b of the light guide rod 3 is collimated to be received by the photo-detector 53. The measurement system will be described in detail later.

As shown in FIG. 12, portions of the infrared light that enter the polished surface 3c of the light guide rod 3 at an incident angle smaller than the critical angle of about 42 degrees are not reflected on the polished surface 3c but are transmitted through the polished surface 3c. In this case, the light-receiving efficiency of the photo-detector 53 for receiving infrared light decreases.

The visible light emitted from the light-emitting diode 54 is also influenced by the critical angle in the same manner as the infrared light. When portions of the visible light are not reflected by the polished surface 3c but are transmitted through the polished surface 3c, the emission amount of visible light decreases.

Figure 15:
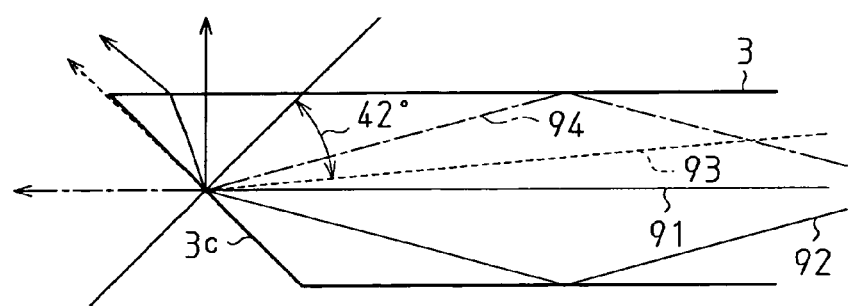
FIG. 15 is a diagram describing visible light that is transmitted through the polished surface.

Such a decrease in the amount of visible light will now be described with reference to FIG. 15. The visible light that travels through the light guide rod 3 includes a straight light portion 91 and a diffusive light portion 92. The straight light portion 91 travels straight. The diffusive light portion 92 is reflected as it travels. The visible light that is incident on the polished surface 3c is not entirely reflected but is partially transmitted through the polished surface 3c. In detail, the straight light portion 91 of the visible light and the diffusive light portion 92 of the visible light entering the polished surface 3c at an incident angle greater than the critical angle of about 42 degrees are reflected on the polished surface 3c as indicated by the solid line in FIG. 15. However, diffusive light portions 93 and 94 of the visible light received by the polished surface 3c at incident angles smaller than the critical angle of about 42 degrees are not reflected on the polished surface 3c but are transmitted through the polished surface 3c.

Figure 16:
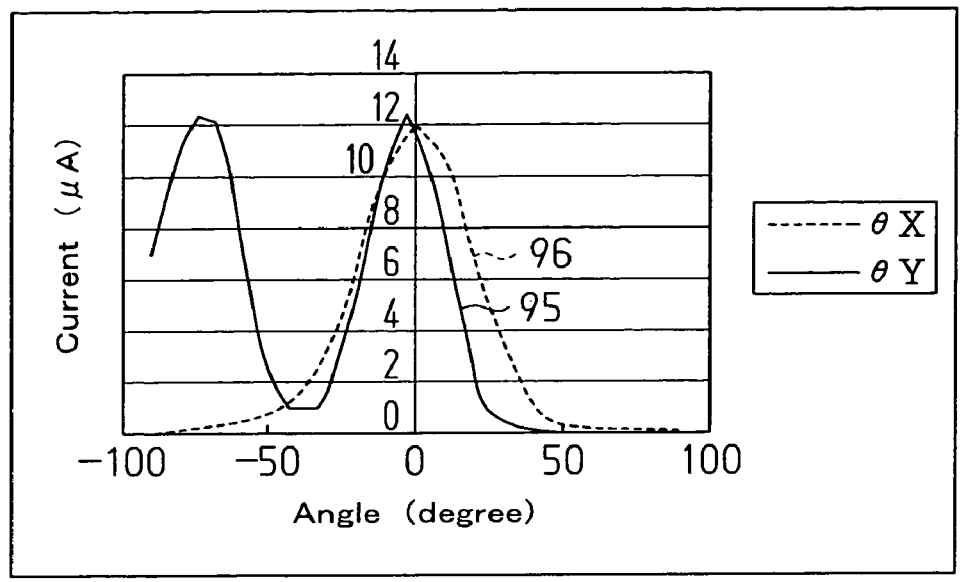
FIG. 16 is a graph showing the relationship between the incident angle of visible light and the intensity of emitted light.

FIG. 16 is a graph showing the relationship between the incident angles (θY and θX) of visible light that enters the polished surface 3c and the corresponding emission intensity of the visible light. The emission intensity of the visible light is changed asymmetrically to the change of the angle θY. The graph reveals that visible diffusive light portions that enter the polished surface 3c at incident angles smaller than the critical angle of about 42 degrees are transmitted through the polished surface 3c and leak out in the optical axis direction.

Figure 17:
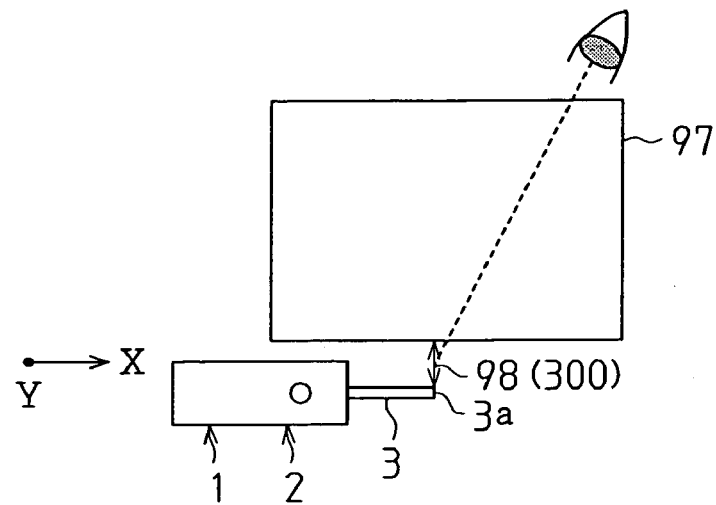
FIG. 17 is a diagram describing an obstacle to the operator's visual identification of visual light.

As shown in FIG. 17, when a large light source 97 or another optical device is arranged in a direction perpendicular to the vibration surface (XY plane) of the distal end 3a of the light guide rod 3, the operator using the infrared light detection device 1 of the first embodiment is unable to visually identify visible light 98 that is output in the direction perpendicular to the XY plane.

Figure 18:
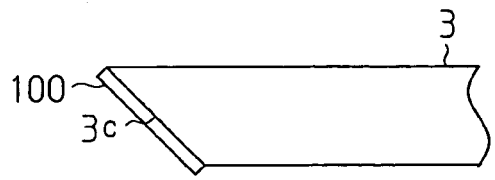
FIG. 18 is a side view of a light guide rod included in an infrared light detection device according to a second embodiment of the present invention.

An essential part of the infrared light detection device 1 of the second embodiment will now be described with reference to FIG. 18. In the second embodiment, a light guide rod 3 includes a polished surface 3c that has been processed to reflect light. FIG. 18 shows the polished surface 3c on which a gold reflection film 100 is formed. The remaining structure of the infrared light detection device 1 of the second embodiment is the same as in the first embodiment.

In addition to the advantages of the first embodiment, the second embodiment has the advantages described below.

(1) The gold reflection film 100 decreases the amount of light transmitted through the polished surface 3c at an incident angle smaller than or equal to the critical angle (about 42 degrees). Thus, the infrared light that enters the polished surface 3c is prevented from being transmitted through the polished surface 3c even when the incident angle (θY) of the infrared light on the polished surface 3c is greater than or equal to −3 degrees (is smaller than or equal to the critical angle) as indicated by the solid line curve 19a in FIG. 19. Thus, the light-receiving efficiency of the photodetector 53 for receiving infrared light is prevented from decreasing drastically. Further, the intensity of visible light emitted from the light-emitting diode 54 is prevented from decreasing accordingly when the incident angle (θY) of the infrared light on the polished surface 3c is greater than or equal to −3 degrees.

Figure 19:
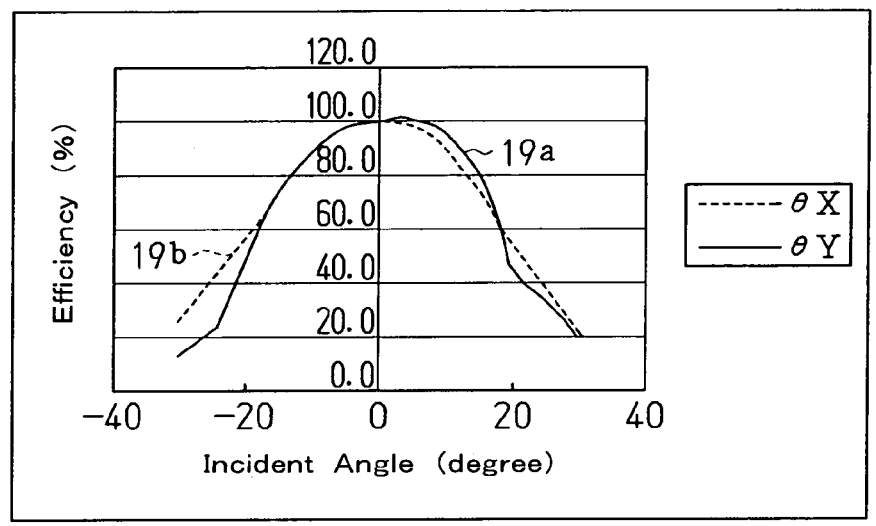
FIG. 19 is a graph showing the relationship between the incident angle of infrared light and the light-receiving efficiency.

In other words, even when the incident angle of infrared light on the polished surface 3c changes, the intensity of the infrared light emitted from the basal end 3b of the light guide rod 3 changes only slightly. This widens the viewing angle of the infrared light, which is invisible light. The curve 19b drawn using a broken line in FIG. 19 shows the light-receiving efficiency change as the angle GY is changed.

Figure 20:
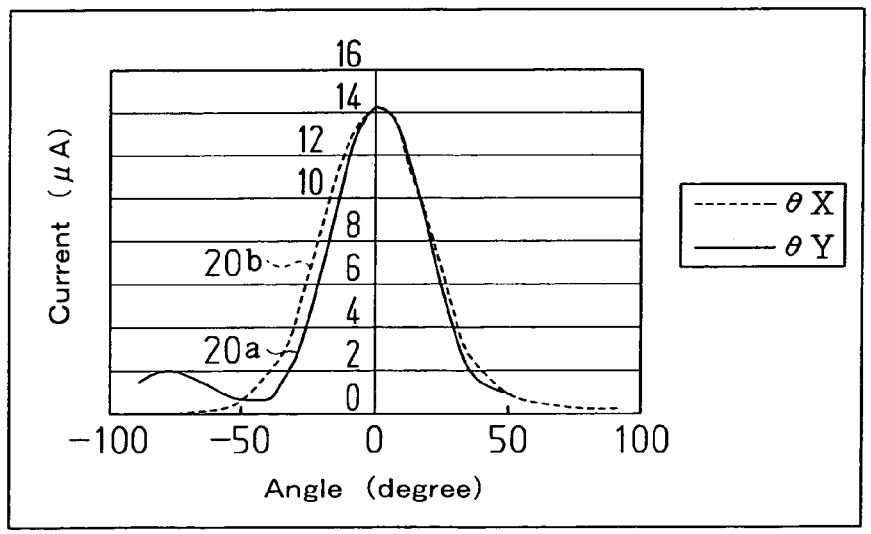
FIG. 20 is a graph showing the relationship between the incident angle of visible light and the intensity of emitted light.

(2) The amount of light transmitted through the polished surface 3c at an incident angle smaller than or equal to the critical angle (about 42 degrees) decreases. Thus, the amount of visible light emitted from the light-emitting diode 54 is prevented from decreasing accordingly. More specifically, without the gold reflection film 100, a portion of emission light (visible light) is transmitted through the polished surface 3c at an incident angle smaller than or equal to the critical angle and is not emitted in the perpendicular direction (θY>0). In the second embodiment, even that portion of emission light (visible light) is output from the distal end 3a. This improves the emission efficiency of the visible light by about 14%. As indicated by the solid line curve 20a in FIG. 20, the angle profile of the emission light approaches a symmetric form. The curve 20b drawn using a broken line in FIG. 20 shows the intensity of emission light (visible light) change as the angle θX is changed.

Figure 21:
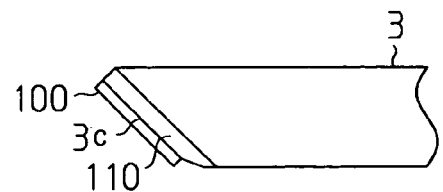
FIG. 21 is a side view of a light guide rod on which a thin gold film is formed and which is included in an infrared light detection device according to a third embodiment of the present invention.
Figure 22A:
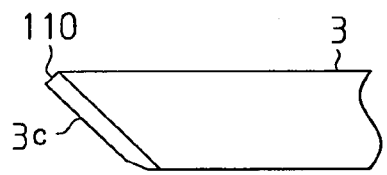
FIG. 22(a) is a side view of the light guide rod of FIG. 21.
Figure 22B:
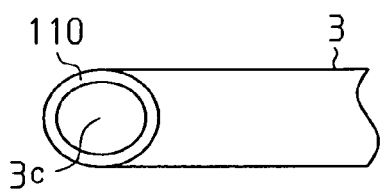
FIG. 22(b) is a bottom view of the light guide rod.

An infrared light detection device 1 according to a third embodiment of the present invention will now be described with reference to FIGS. 21 and 22.

The infrared light detection device 1 of the third embodiment uses a light guide rod 3 having a polished surface 3c around which a chamfered portion 110 is formed.

In addition to the advantages of the second embodiment, the third embodiment has the advantages described below.

Figure 23:
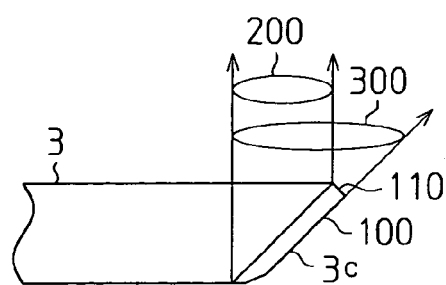
FIG. 23 is a diagram describing the operation of an infrared light detection device according to a third embodiment of the present invention.

(1) Visible light is diffused at the chamfered portion 110 and leaks out at the chamfered portion 110. As a result, the visible light is emitted from the polished surface 3c as a wide light flux 300 (refer to FIG. 23). The operator is able to visually identify the wide light flux 300 even when viewing it in a direction diagonal to the optical axis of the light guide rod 3. The operator is able to estimate the amount of the incident light flux (invisible light). As a result, even when the large light source 97 shown in FIG. 17 or another optical device etc. is arranged in the direction perpendicular to the vibration surface (XY plane) of the distal end 3a of the light guide rod 3, the operator is able to visually identify the wide light flux 300 of the visible light (visible light 98), which is emitted from the distal end 3a of the light guide rod 3, by viewing it in a direction diagonal to the optical axis of the light guide rod 3. Without the chamfered portion 110, a narrow light flux 200 is emitted from the distal end 3a of the light guide rod 3 in a direction perpendicular to the core axis. In this case, the operator would not be able to visually identify the narrow light flux 200 when viewing it in a direction diagonal to the narrow light flux 200.

The method for evaluating the dependence of the light-receiving angle of the light guide rod 3 on the light-receiving efficiency, which is described in the second embodiment, will now be described.

First, an incident angle evaluation unit, which measures the relationship between the incident angle of infrared light and the light-receiving efficiency of the infrared light shown in the graph of FIG. 19, will be described with reference to FIGS. 24 to 27.

Figure 24:
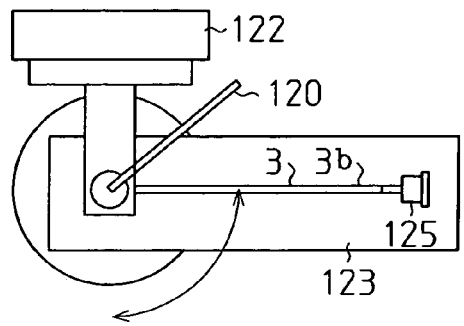
FIG. 24 is a plan view of an incident angle evaluation unit.
Figure 25:
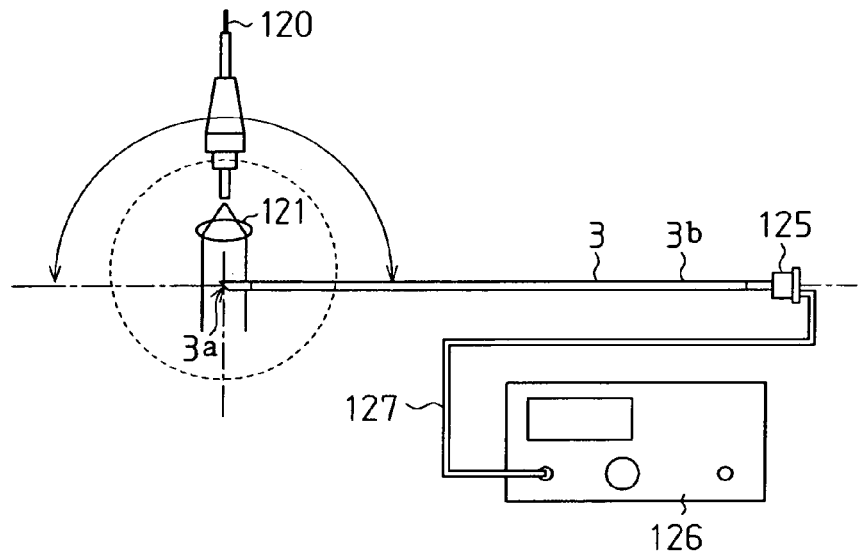
FIG. 25 is a side view of the incident angle evaluation unit.

FIG. 24 is a plan view of the incident angle evaluation unit. FIG. 25 is a side view of the incident angle evaluation unit.

As shown in FIG. 25, the incident angle evaluation unit uses, as a light source, parallel light obtained by collimating, via a collimate lens 121, light that is directed by a single mode optical fiber 120. The distal end of the single mode optical fiber 120 and the collimate lens 121 are fixed to a rotary stage 122. The rotary stage 122 is used to change the direction in which the parallel light is emitted from the collimate lens 121. To enable the same incident angle evaluation unit to evaluate both the angles θY and θX, the measurement mechanism is such that a stage 123 to which the light guide rod 3 is fixed is rotatable by 90°.

Figure 26:
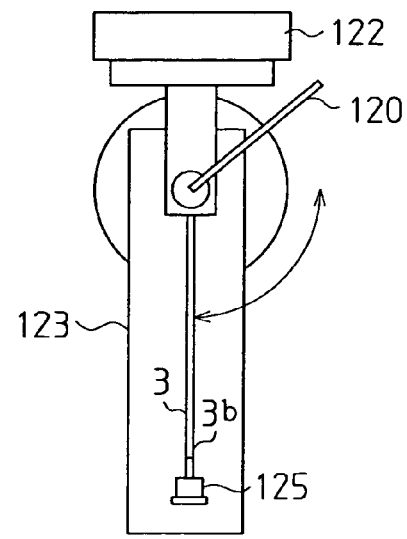
FIG. 26 is a plan view of the incident angle evaluation unit whose stage is rotated.
Figure 27:
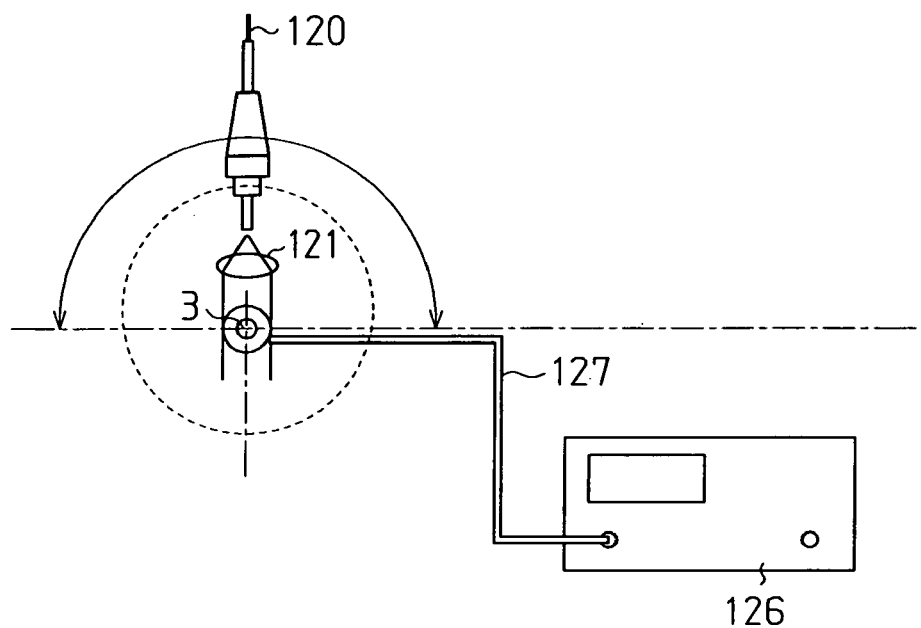
FIG. 27 is a side view of the incident angle evaluation unit of FIG. 26.

The stage 123 is set to extend horizontally as shown in FIGS. 24 and 25 to enable the angle θY to be evaluated. The stage 123 is set to extend vertically as shown in FIGS. 26 and 27 to enable the angle θX to be evaluated.

The intensity of light entering the polished surface 3c (not shown in FIG. 25) of the distal end 3a of the light guide rod 3 is measured using a photo-detector 125 fixed to the basal end 3b of the light guide rod 3. A current detection unit 126 detects current output from the photo-detector 125 via wiring 127.

Figure 28:
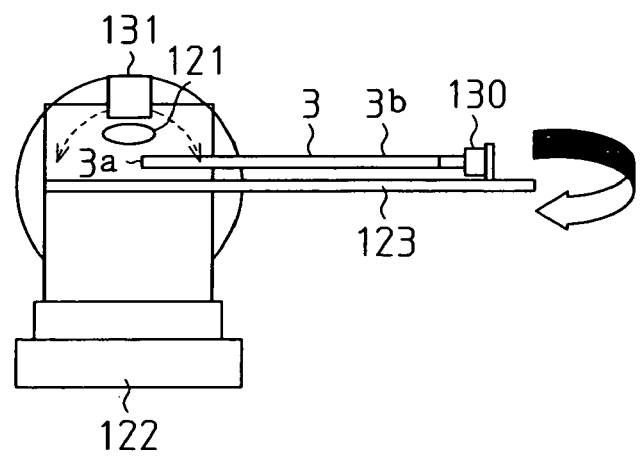
FIG. 28 is a side view of an output angle evaluation unit.

An output angle evaluation unit, which measures the relationship between the output angle of visible light and the emission intensity of the visible light shown in the graph of FIG. 20, will now be described with reference to FIG. 28.

The output angle evaluation unit evaluates the output angle of visible light emitted from the distal end 3a of the light guide rod 3 in the same manner as the incident angle evaluation unit described above except for the following points. The output angle evaluation unit includes a light-emitting diode 130 for emitting visible light, which is arranged in lieu of the photo-detector 125 in the incident angle evaluation unit, and a photo-detector 131 for receiving visible light, which is arranged in lieu of the single mode optical fiber 120 in the incident angle evaluation unit.

An infrared light detection device according to a fourth embodiment of the present invention will now be described.

The infrared light detection device of the fourth embodiment uses a white light-emitting diode as a light-emitting element for emitting visible light in lieu of the light-emitting diode 54, which is an orange light-emitting diode for emitting visible light having a peak wavelength of 610 nm (orange) used in the first embodiment. The remaining structure of the infrared light detection device of the fourth embodiment is the same as in the first embodiment.

The white light-emitting diode is formed by combining a blue light-emitting diode and a phosphor. The white light-emitting diode has a wide emission spectrum for wavelengths ranging from about 450 to 700 nm.

In addition to the advantages of the first embodiment; the fourth embodiment has the advantages described below.

The white light-emitting diode having a wide emission spectrum for wavelengths ranging from about 450 to 700 nm is used as the light-emitting element for emitting visible light. Thus, even when the operator uses various kinds of protective glasses differing in transmission spectrums, the operator wearing each kind of such protective glasses is able to visually identify visible light emitted from the white light-emitting diode.

A fifth embodiment of the present invention will now be described.

Figure 29A:
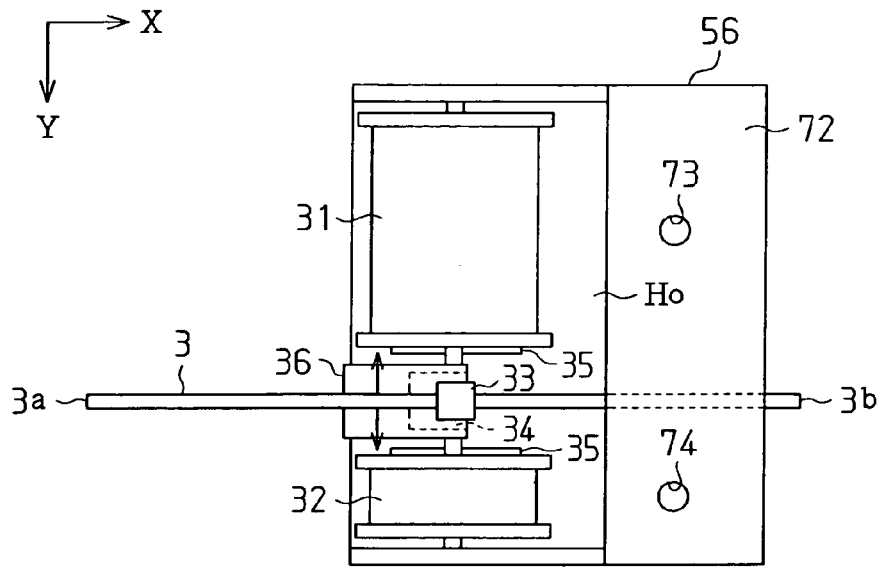
FIGS. 29(a), 29(b), and 29(c) are respectively a plan view, a front view, and a cross-sectional view of a Y-direction vibration drive system according to a fifth embodiment of the present invention.
Figure 29B:
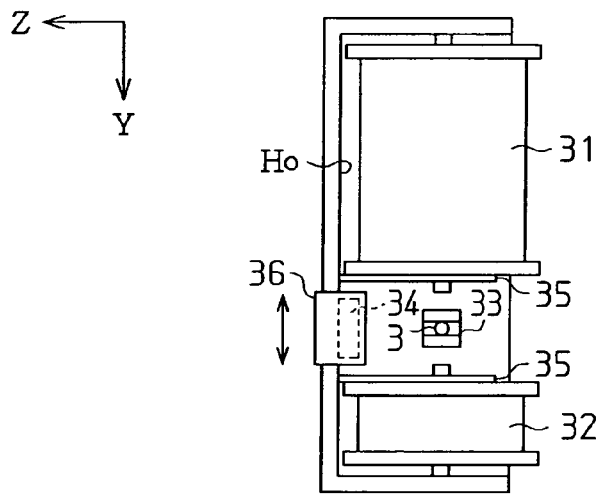
Figure 29C:
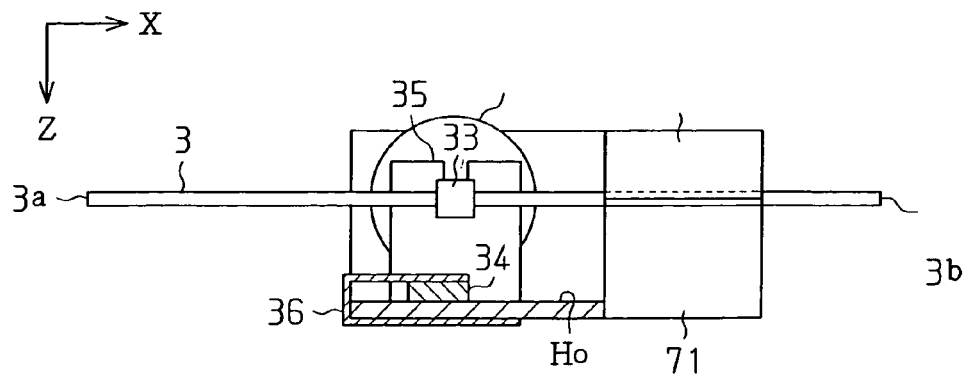

As shown in FIG. 29(a), an upper surface of a permanent magnet 33, which is fixed to a light guide rod 3, functions as the north pole and a lower surface of the permanent magnet 33 functions as the south pole. A drive coil 31 and a feedback coil 32 are respectively attached to flex upper and lower surfaces of an optical system substrate 56. Two brackets 35 are attached to a side surface Ho of the optical system substrate 56 so that the brackets 35 hold the top and lower surfaces of the permanent magnet 33. Each bracket 35 is U-shaped (refer to FIG. 29c). The two brackets 35 support the drive coil 31 and the feedback coil 32. The drive coil 31 and the feedback coil 32 respectively face the top and lower surfaces of the permanent magnet 33.

The magnetic poles of the drive coil 31 are switched by changing the direction of the drive current that flows through the drive coil 31. The switching of the magnetic poles of the drive coil 31 causes the light guide rod 3 to vibrate (swing) in the Y-direction with its basal end 3b serving as a fulcrum.

The feedback coil 32 detects the resonance frequency that changes depending on its ambient temperature or its method of fixation. The feedback coil 32 then provides a frequency control circuit (not shown) with the detected resonance frequency.

The infrared light detection device of the fifth embodiment includes an adjustment unit for adjusting vibration of the light guide rod 3 in the Y-direction to prevent the vibration direction of the light guide rod 3, which is controlled by the Y-direction vibration system, from deviating from the Y-direction, or from being diagonal to the Y-direction. The adjustment unit includes an adjustment-purpose permanent magnet 34, which is attached to the optical system substrate 56. The adjustment-purpose permanent magnet 34 is arranged so that its magnetic poles face the corresponding same magnetic poles of the permanent magnet 33. In the fifth embodiment, an upper surface of the adjustment-purpose permanent magnet 34 is its north pole, and a lower surface of the adjustment-purpose permanent magnet 34 is its south pole. The adjustment-purpose permanent magnet 34 is attached to the side surface Ho of the optical system substrate 56 by a bent plate-like holder 36. The holder 36 is made from a non-magnetic material, such as aluminum. The holder 36 is movable in the Y-direction along the side surface Ho. The holder 36 is moved along the side surface Ho to adjust the position of the adjustment-purpose permanent magnet 34 in the Y-direction.

The light guide rod 3 is a cantilevered round optical fiber. The distal end 3a of the light guide rod 3 may vibrate in various directions when the drive coil 31 is operating. The light guide rod 3 may vibrate in an inappropriate manner due to various factors including, for example, variations in the assembly precision of the bases 71 and 72, unbalanced weight due to bonding of the coils 31 and 32, mechanical distortion of the based 71 and 72, and uneven supporting of the light guide rod 3. When the vibration of the light guide rod 3 has a Z-direction element, inappropriate vibration of the light guide rod 3 occurs. Examples of inappropriate vibration of the light guide rod 3 include vibration in a direction diagonal to the Y-direction, vibration forming an oval track that extends along the Y-direction, and vibration forming an oval track that extends in a direction diagonal to the Y-direction.

A magnetic repulsive force from the adjustment-purpose permanent magnet 34 prevents such inappropriate vibration of the light guide rod 3. The position of the adjustment-purpose permanent magnet 34 is changed in a manner that repulsive magnetic fields of the magnets 33 and 34 eliminate the vibration element in the Z-direction. As a result, the adjustment-purpose permanent magnet 34 restricts the vibration of the light guide rod 3 so that the light guide rod 3 vibrates on the XY plane.

Figure 31:
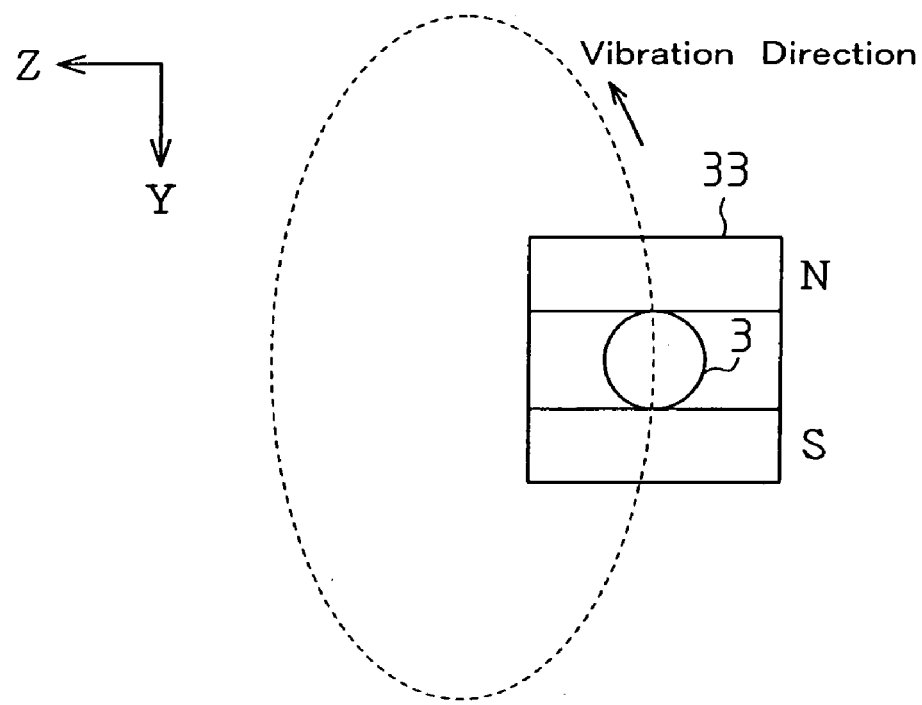
FIG. 31 is a diagram describing inappropriate vibration of the light guide rod.

FIG. 31 shows a case in which the light guide rod 3 vibrates around the X axis so as to form an oval track. In this case, the adjustment-purpose permanent magnet 34 is first arranged in a manner that its magnetic poles face the corresponding same magnetic poles of the permanent magnet 33. As a result, the distribution of the repulsive magnetic fields of the permanent magnet 33 and the adjustment-purpose permanent magnet 34 changes. This restricts inappropriate vibration of the light guide rod 3 that forms such an oval shape. As a result, the light guide rod 3 vibrates on the XY plane.

Figure 30A:
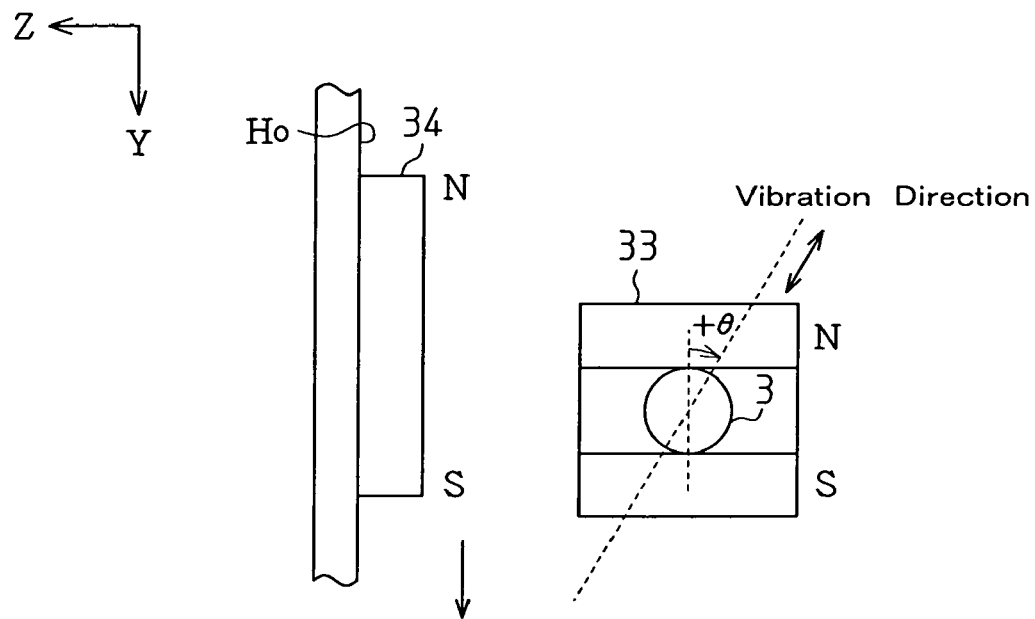
FIGS. 30(a) and 30(b) are diagrams describing the effect of an adjustment-purpose magnet.

As one example, FIG. 30a shows a case in which the vibration surface of the light guide rod 3 is inclined by an angle of +θ with respect to the XY plane. In this case, the adjustment-purpose permanent magnet 34 is moved downward. As a result, the distribution of the repulsive magnetic fields between the south poles of the permanent magnet 33 and the adjustment-purpose permanent magnet 34 is adjusted. This causes a lower portion of the adjustment-purpose permanent magnet 34 to apply force to correct the vibration of the light guide rod 3 to the right. The Z-direction vibration element of the light guide rod 3 is eliminated. As a result, the light guide rod 3 vibrates on the XY plane.

Figure 30B:
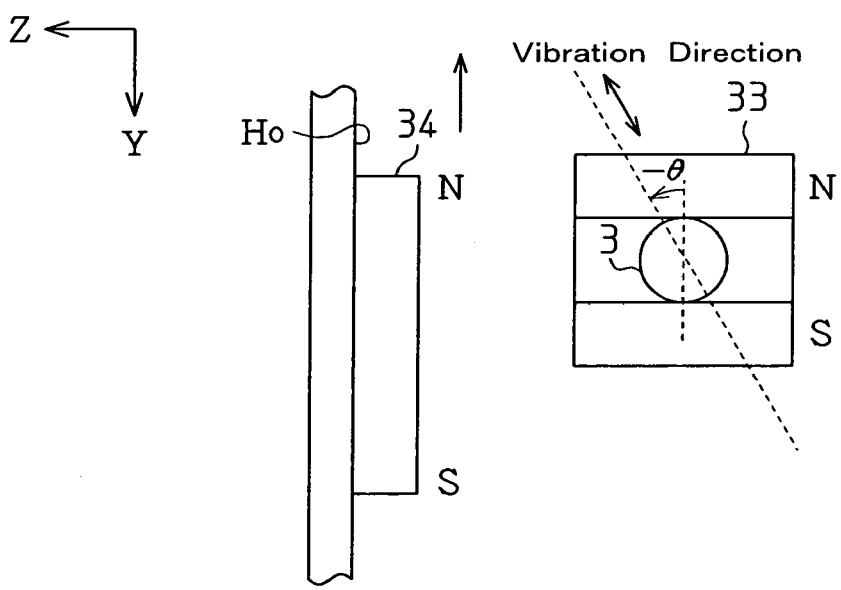

As another example, FIG. 30b shows a case in which the vibration surface of the light guide rod 3 is inclined by an angle of −θ with respect to the XY plane. In this case, the adjustment-purpose permanent magnet 34 is moved upward. As a result, the distribution of the repulsive magnetic fields between the north poles of the permanent magnet 33 and the adjustment-purpose permanent magnet 34 is adjusted. This causes an upper portion of the adjustment-purpose permanent magnet 34 to apply force to correct the vibration of the light guide rod 3 to the right. The Z-direction vibration element of the light guide rod 3 is eliminated. As a result, the light guide rod 3 vibrates on the XY plane.

In addition to the advantages of the first embodiment, the fifth embodiment has the advantages described below.

At the assembly of the drive mechanism, the processing precision or the assembly precision of the components supporting the light guide rod 3 (e.g., the bases 71 and 72 and the coils 31 and 32) may vary. This may cause the light guide rod 3 to vibrate off the XY plane. Even after the assembly of the drive mechanism, the vibration of the light guide rod 3 is restricted to be on the XY plane by adjusting the position of the adjustment-purpose permanent magnet 34 with respect to the permanent magnet 33. As a result, the components supporting the light guide rod 3 require less assembly precision and less processing precision. This widens the range of selections of the components supporting the light guide rod 3. The infrared light incident in a direction perpendicular to the XY plane is incident in a direction perpendicular to the light guide rod 3. In this case, the distal end 3a of the light guide rod 3 leaves an afterimage of visible light, which is displayed as a circular afterimage. As a result, the operator is able to visually identify the position of the infrared light, which is invisible light.

The fifth embodiment may be modified in the following forms.

The adjustment-purpose permanent magnet 34 may be fixed directly to the side surface Ho by an adhesive. In this case, the adjustment-purpose permanent magnet 34 is fixed at a position that enables the light guide rod 3 to vibrate on the XY plane.

Instead of the single adjustment-purpose permanent magnet 34 attached to the side surface Ho of the optical system substrate 56, a plurality of adjustment-purpose permanent magnets 34 may be arranged to hold the permanent magnet 33. For example, a tubular optical system substrate 56 having a side surface Ho and a second side surface facing the side surface Ho may be used. The plurality of adjustment-purpose permanent magnets 34 may be attached to the side surface Ho and the second side surface. In this case, the distribution of the repulsive magnetic fields between the adjustment-purpose permanent magnets 34 and the permanent magnet 33 is adjusted by adjusting the position of each adjustment-purpose permanent magnet 34.

In the fifth embodiment, the upper surfaces of the permanent magnet 33 and the adjustment-purpose permanent magnet 34 may function as the south poles and the lower surfaces of the permanent magnet 33 and the adjustment-purpose permanent magnet 34 may function as the north poles.

An infrared light detection device according to a six embodiment of the present invention will now be described focusing on its differences from the first embodiment.

Figure 32:
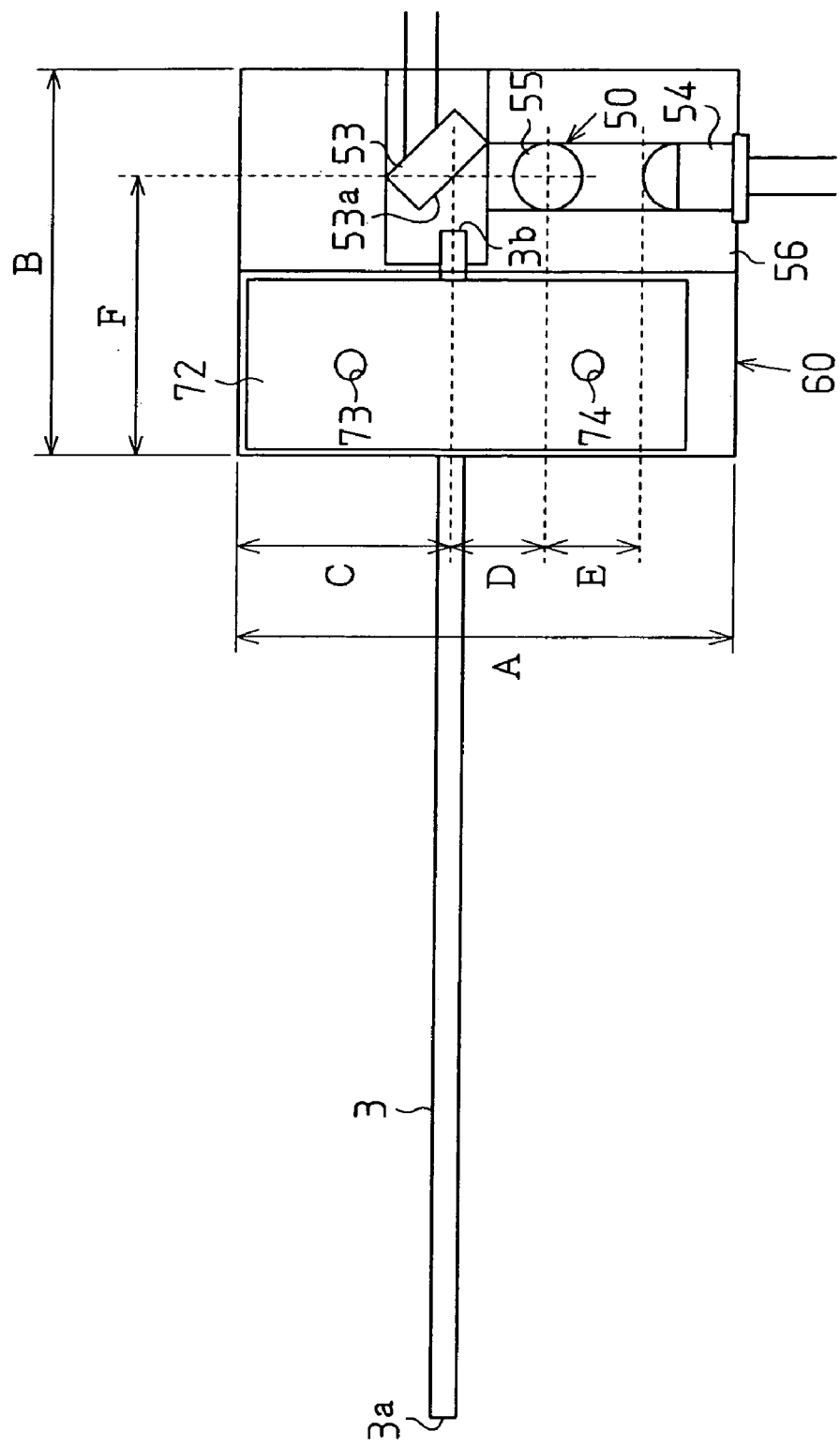
FIG. 32 is a plan view of an optical system according to a sixth embodiment of the present invention.

As shown in FIG. 32, an optical system 50 includes a photo-detector 53, a light-emitting diode 54, and a focusing lens 55. Visible light emitted from the light-emitting diode 54 is focused by the focusing lens 55. The light is then reflected by a light-receiving surface 53a of the photo-detector 53 and enters a basal end 3b of a light guide rod 3. The focusing lens 55 is, for example, a spherical lens. The optical elements of the optical system 50 are arranged on an optical system substrate 56.

Infrared light is emitted from the basal end 3b of the light guide rod 3 and directly enters the light-receiving surface 53a of the photo-detector 53. In other words, the infrared light from the light guide rod 3 enters the light-receiving surface 53a of the photo-detector 53 without traveling through an optical filter, such as an infrared filter, or a lens. The photo-detector 53 subjects the received infrared light to photoelectric conversion to generate a detected light signal (output current) S1. The photo-detector 53 provides an analog signal processing circuit 41 with the detected light signal S1.

Figure 33:
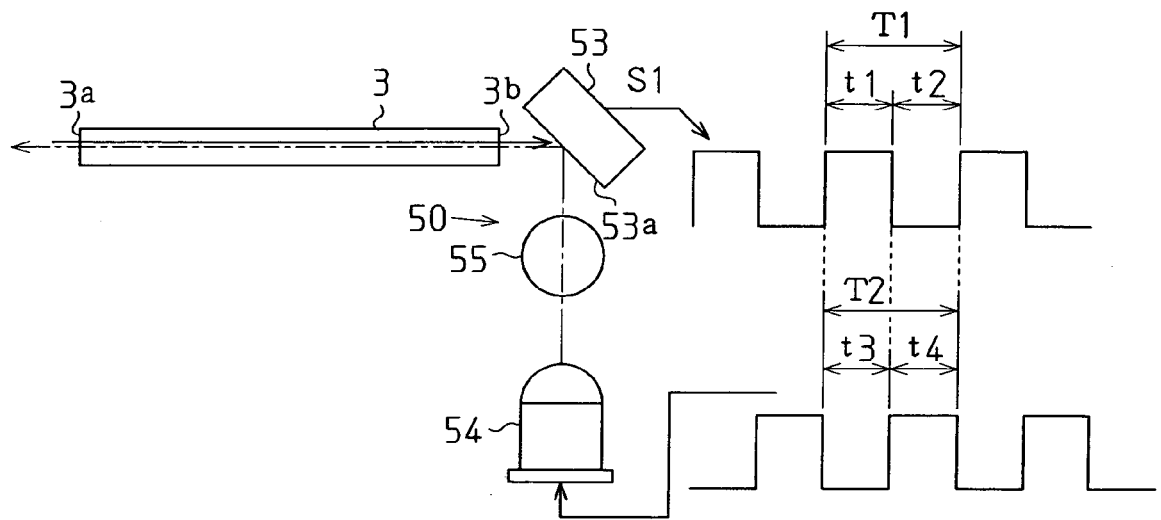
FIG. 33 is a diagram describing the operation of an analog signal processing circuit according to the sixth embodiment.
Figure 34:
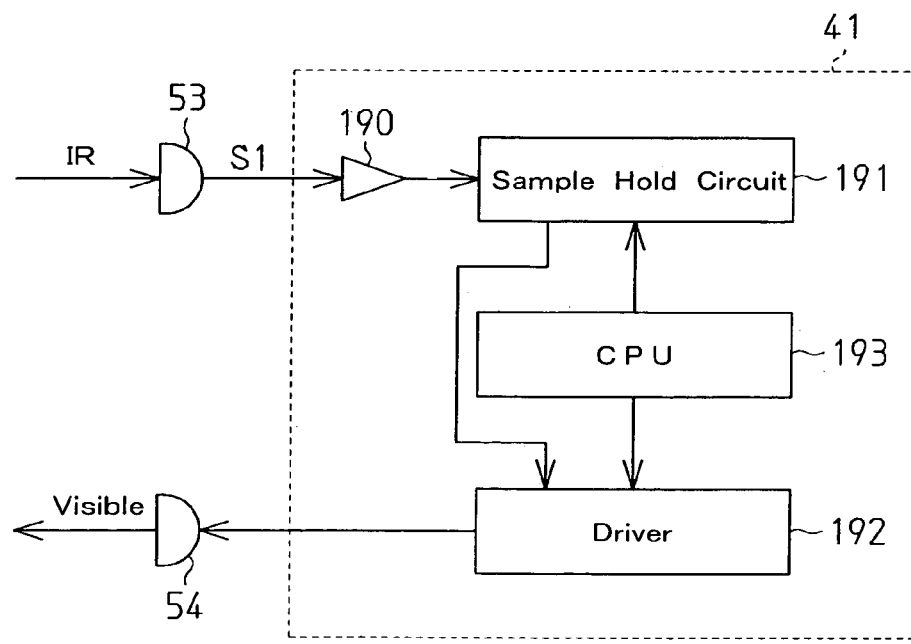
FIG. 34 is a block diagram showing the electric configuration of the analog signal processing circuit.

As shown in FIG. 34, the analog signal processing circuit 41 includes an amplifier 190, a sample-hold circuit 191, a driver 192, and a CPU 193. The amplifier 190 amplifies the detected light signal S1 output from the photo-detector 53. The sample-hold circuit 191 samples the detected light signal S1. The driver 192 drives the light-emitting diode 54 in accordance with an output signal of the sample-hold circuit 191. The CPU 193 controls the sample-hold circuit 191 and the driver 192. The CPU 193 controls the sample-hold circuit 191 and the driver 192 to alternately perform the sampling of the detected light signal S1 and the driving of the light-emitting diode 54. As shown in FIG. 33, the sampling is performed during time t1, and the driving of the light-emitting diode 54 is performed during time t4.

The sample-hold circuit 191 repeats the sampling operation (time t1) and the output operation (time t2) in fixed cycles T1 (refer to FIG. 33). The sampling operation samples the detected light signal for a fixed period of time, generates a voltage signal, and holds the voltage signal. The output operation outputs the voltage signal. The cycle T1 is, for example, 50 µs (frequency: 20 KHz).

The sample-hold circuit 191 includes, for example, a switch and a capacitor. When the switch is turned on, the capacitor is charged based on the sampled detected light signal (current signal). When the switch is turned off, the capacitor holds charge in accordance with the current value of the detected light signal. The switch is an analog switch that operates based on a clock signal with the above frequency (20 KHz). The analog switch is used to switch the operation of the driver 192.

The driver 192 illuminates the light-emitting diode 54 in accordance with the voltage signal output from the sample-hold circuit 191 during the output operation of the sample-hold circuit 191 (time t4). The driver 192 does not drive the light-emitting diode 54 during the sampling operation of the sample-hold circuit 191 (time t3). Thus, the driver 192 repeats the drive operation (time t4) and the non-drive operation (time t3) in fixed cycles T2. The driver 192 is, for example, a drive IC.

The drive IC may include a switching element, which is connected in series to the light-emitting diode 54, and a stabilizing power supply (not shown). The switching element is turned on only when the output signal (voltage signal) of the sample-hold circuit 191 is input into the gate of the switching element. When the switching element is turned on, drive current flows through the light-emitting diode 54 and illuminates the light-emitting diode 54.

The photo-detector 53 will now be described.

Figure 35:
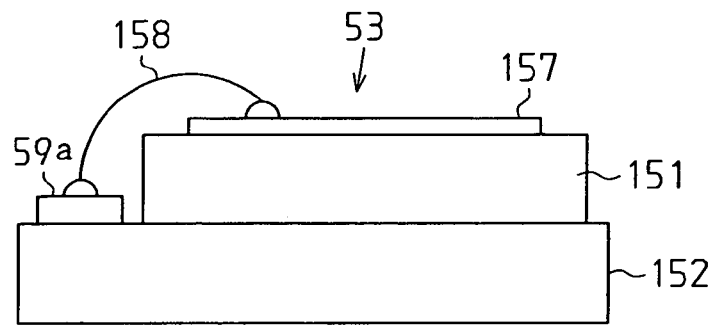
FIG. 35 is a side view of a photo-detector used in the sixth embodiment.
Figure 36:
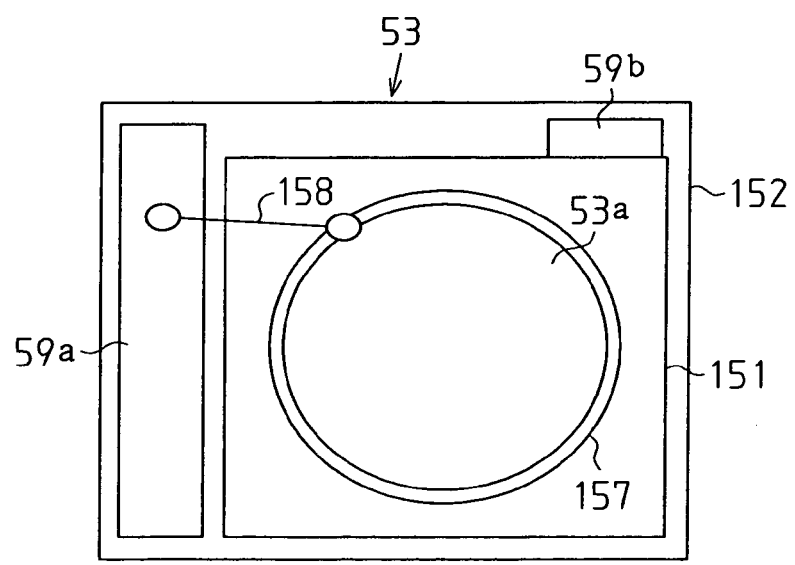
FIG. 36 is a plan view of the photo-detector of FIG. 35.

As shown in FIGS. 35 and 36, the photo-detector 53 includes a semiconductor chip 151, which is bonded to a ceramic substrate 152. An upper surface of the semiconductor chip 151 is formed as a mirror surface, and functions as a light-receiving surface 53*a*. A ring electrode 157 is formed on the upper surface of the semiconductor chip 151. Two wiring electrodes 59*a* and 59*b* are formed on an upper surface of the ceramic substrate 152. A lead wire 158 connects the ring electrode 157 and the wiring electrode 59*a*.

In the infrared light detection device 1, visible light emitted from the light-emitting diode 54 is focused by the focusing lens 55. The light-receiving surface 53*a* is inclined at an angle of 45 degrees with respect to the optical axis of the focusing lens 55. Although such inclination slightly reduces the projection area of the light-receiving surface 53*a*, the light-receiving surface 53*a*, which is formed as a mirror surface, reflects visible light emitted from the light-emitting diode 54.

The operation of the infrared light detection device 1 of the sixth embodiment will now be described.

When infrared light enters the distal end 3*a* of the light guide rod 3, the infrared light is reflected by the polished surface 3*c*, travels along the light guide rod 3 to its basal end 3*b*, is emitted from the basal end 3*b* of the light guide rod 3, and directly enters the photo-detector 53. The photo-detector 53 subjects the received infrared light to photoelectric conversion to generate a detected light signal (output current). The amplifier 190 amplifies the detected light signal and provides the sample-hold circuit 191 with the amplified detected light signal.

During the sampling operation of the sample-hold circuit 191 (time t1), the driver 192 does not drive the light-emitting diode 54 (time t3). During the output operation of the sample-hold circuit 191 (time t2), the driver 192 illuminates the light-emitting diode 54. As a result, the sampling of the detected light signal by the sample-hold circuit 191 and the driving of the light-emitting diode 54 by the driver 192 are performed alternately. The light-emitting diode 54 is intermittently illuminated in fixed cycles. Visible light emitted from the light-emitting diode 54 is output from the polished surface 3*c* of the light guide rod 3 in the direction perpendicular to the core axis. The output visible light is visually identified by the operator. The photo-detector 53 detects infrared light when the light-emitting diode 54 is not illuminated.

In addition to the advantages of the first embodiment, the sixth embodiment has the advantages described below.

Infrared light entering the distal end 3*a* of the light guide rod 3 is directly received by the light-receiving surface 53*a* of the photo-detector 53. This structure eliminates the need for a filter that prevents positive feedback amplification of the infrared light by visible light emitted from the light-emitting diode 54. In this structure, the basal end 3*b* of the light guide rod 3 is arranged close to the light-receiving surface 53*a* of the photo-detector 53. This minimizes diffusion of infrared light emitted from the basal end 3*b*. Thus, this structure also eliminates the need for a lens for focusing the infrared light to be incident on the light-receiving surface 53*a* of the photo-detector 53. The optical system 50 is compact, light, and inexpensive. Further, the infrared light detection device 1 is compact, light, and inexpensive. Additionally, the optical system 50 requires less optical adjustment.

The infrared light detection device 1 of the sixth embodiment enables the optical system portion of the visible light-emitting unit to be shortened. This advantage of the infrared light detection device 1 will now be described in comparison with an infrared light detection device shown in FIG. 38.

Figure 38:
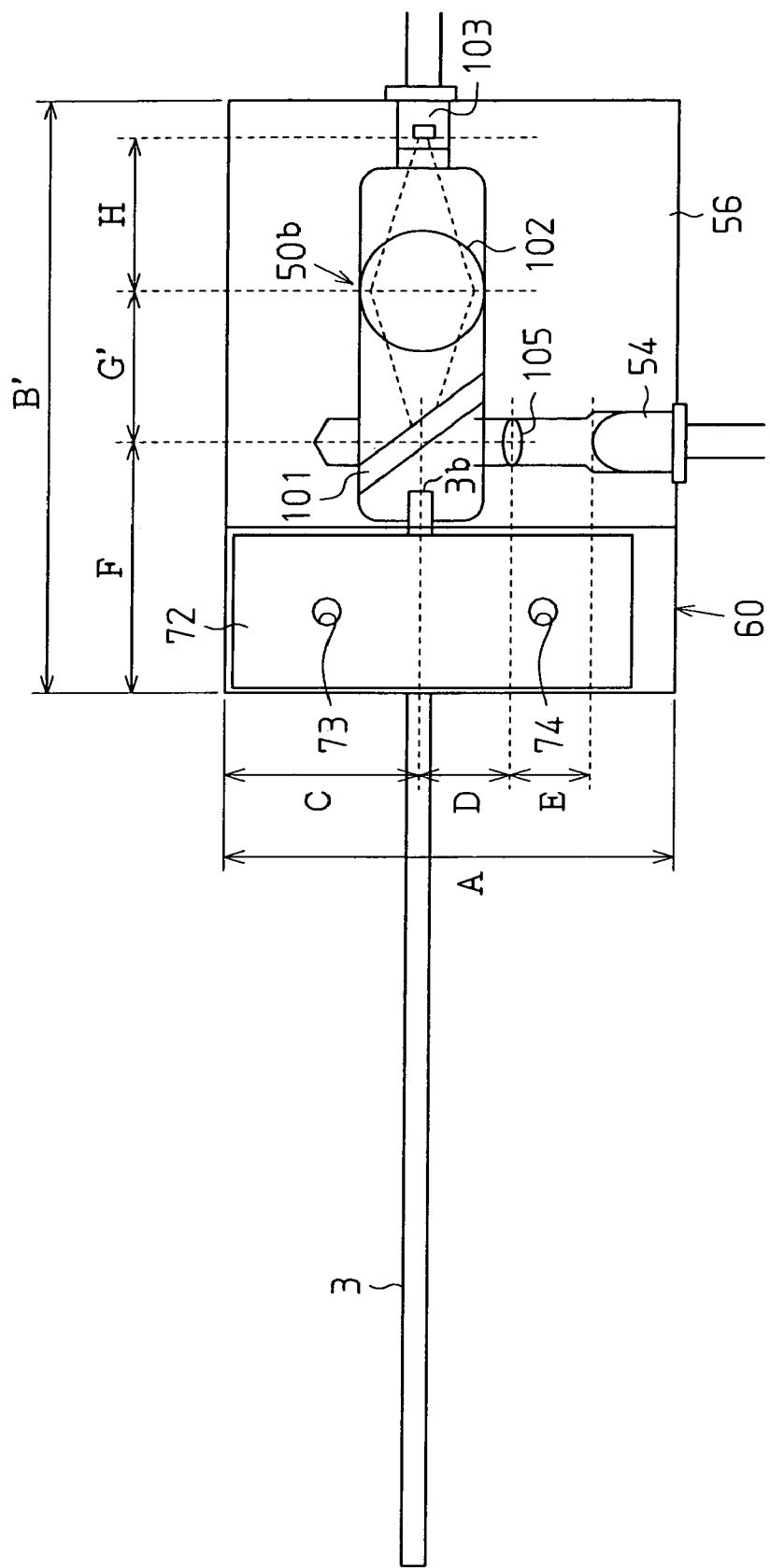
FIG. 38 is a plan view schematically showing the structure of an optical system of an infrared light detection device according to a comparative example.

An optical system 50*b* included in the infrared light detection device shown in FIG. 38 includes a mirror surface Si substrate 101 and a spherical lens 102, which are arranged between a basal end 3*b* of a light guide rod 3 and a photo-detector 103. The mirror surface Si substrate 101 functions as an infrared transmissive filter. The spherical lens 102 focuses infrared light that has been transmitted through the mirror surface Si substrate 101. The mirror surface Si substrate 101 has a transmittance of 70% for light having a wavelength of 1550 nm. A focusing lens 105 focuses visible light emitted from a light-emitting diode 54.

The infrared light detection device shown in FIG. 38 has dimensions A of 28.5 mm, B' of 34 mm, C of 10 mm, D of 5.5 mm, E of 5.5 mm, F of 15 mm, G' of 8.5 mm, and H of 8.5 mm.

The infrared light detection device 1 of the sixth embodiment eliminates the need for the mirror surface Si substrate 101 and the spherical lens 102. Thus, dimension B (length of the optical system substrate 56 in the X-direction) of the infrared light detection device 1 is shorter than dimension B' shown in FIG. 38. Further, the optical system 50 is lighter than the optical system 50*b*.

The optical system 50 is light. Thus, the rotary slider stepping motor 21 enables the module 60, which includes the optical system 50 and the electric circuits, and the light guide rod 3 to reciprocate quickly in the X-direction with less vibration.

The optical system 50 in the sixth embodiment does not include an optical filter, such as an infrared filter. Thus, only the wavelength characteristic of the photo-detector 53 limits the wavelength of detected light to be detected. Thus, the infrared light detection device of the sixth embodiment is enabled to detect light having various wavelengths simply by changing its photo-detector 53.

Figure 39:
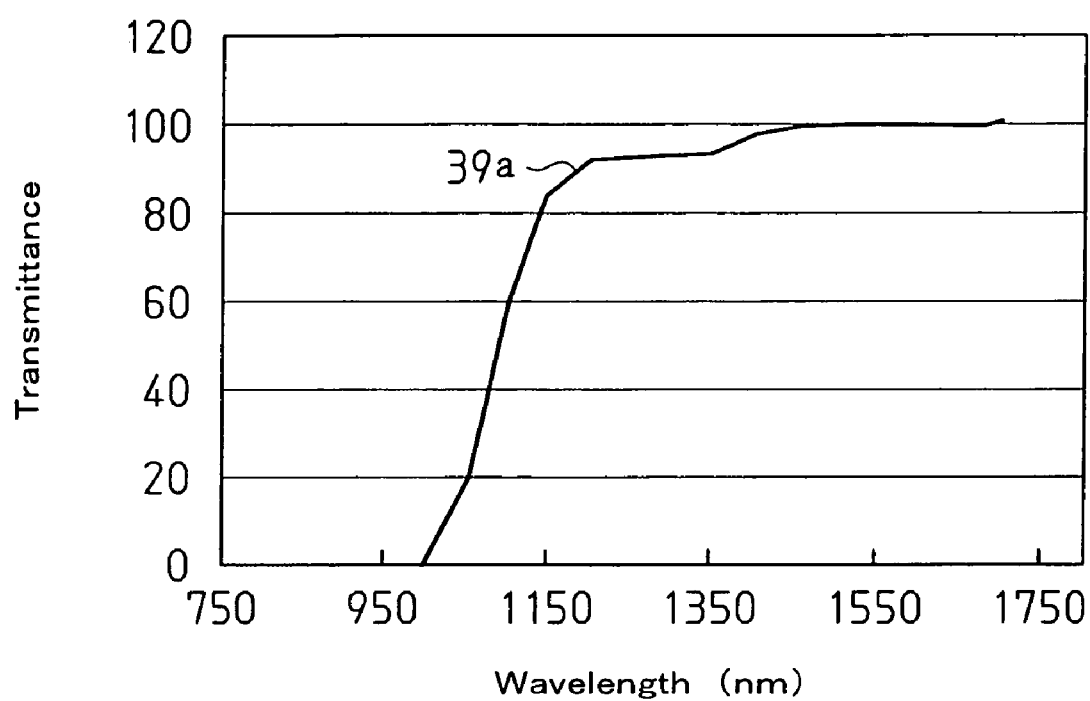
FIG. 39 is a graph showing the transmissive wavelength characteristic of the infrared filter.

FIG. 39 shows the transmissive wavelength characteristic of the mirror surface Si substrate 101 used in the infrared light detection device of FIG. 38. As indicated by the curve 39*a*, the mirror surface Si substrate 101 insulates light having wavelengths less than or equal to 1000 nm. Light having wavelengths less than or equal to 1000 nm fails to reach the photo-detector 53 and is not detected by the infrared light detection device shown in FIG. 38. To detect light in an ultraviolet region having wavelengths less than or equal to 400 nm, the infrared light detection device is required to include a filter for transmitting light having wavelengths less than or equal to 400 nm and insulating light having a wavelength of 610 nm. The use of such a filter eliminates an influence of visible light (610 nm) that is emitted from the light-emitting diode 54. The amplification factor of the amplifier 190 is about 50 dB. To prevent positive feedback of the infrared light, the infrared light detection device is required to include a filter having the insulation characteristic of insulating light having wavelengths ranging from 400 to 610 nm. The designing of such a filter is extremely difficult.

Figure 37:
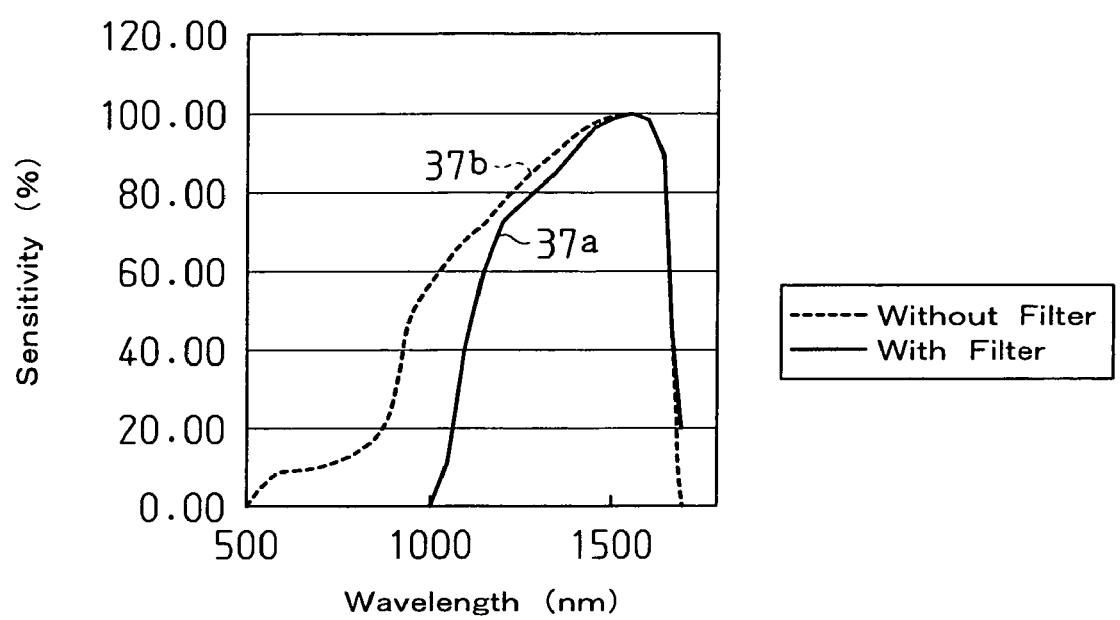
FIG. 37 is a graph showing the detection characteristic of the photo-detector depending on whether or not an infrared filter is used.

In FIG. 37, the curve 37a indicates the detection characteristic of the photo-detector 53 when the infrared light detection device includes a filter, and the curve 37b indicates the detection characteristic of the photo-detector 53 when the infrared light detection device does not include a filter. The horizontal axis indicates the wavelength of the light that is to be detected, and the vertical axis indicates the detection sensitivity of the photo-detector 53.

Due to the detection sensitivity (−3 dBm) of the photo-detector 53, the lower limit of the wavelength of light detectable by the infrared light detection device shown in FIG. 38, which includes the infrared filter, is 1150 nm.

The infrared light detection device of the sixth embodiment eliminates the need for such an infrared filter for preventing positive feedback amplification by visible light. The lower limit of the wavelength of light detectable by the infrared light detection device of the sixth embodiment is 950 nm, which is lower than that of the infrared light detection device shown in FIG. 38. The wavelength of detectable light is determined by the sensitivity of the photo-detector 53 and the wavelength characteristic of the light guide rod 3. Thus, the infrared light detection device of the sixth embodiment is applicable to detection of light having various wavelengths.

The analog signal processing circuit 41 time-shares the sampling process with the sample-hold circuit 191 and the driving process with the driver 192. Thus, even without a filter (infrared filter), the infrared light detection device 1 prevents positive feedback amplification of infrared light by visible light.

The sample-hold circuit 191 holds, in its capacitor, the voltage signal resulting from the photoelectric conversion of the sampled detected light signal (current signal). The driver 192 drives the light-emitting diode 54 using the voltage signal. Such analog processing is performed at a higher speed than digital processing of the voltage signal of the sample-hold circuit 191 using a microcomputer. As a result, the illumination cycle of the light-emitting diode 54 is shortened. This prevents an afterimage of visible light, which is output from the distal end 3a of the light guide rod 3, from flickering.

The flickering of an afterimage of light will now be discussed.

For example, when the light guide rod 3 vibrates at a vibration frequency of 100 Hz in the Y-direction and the light-emitting diode 54 is illuminated at a frequency of 20 KHz, the time required for the light guide rod 3 to reciprocate once in the Y-direction is 10 msec. When the vibration magnitude of the light guide rod 3 is 15 mm, the light guide rod 3 is moved by 30 mm in 10 msec. In this case, the light-emitting diode 54 is illuminated whenever the light guide rod 3 is moved by 150 µm. (The light guide rod 3 is actually moved by a distance greater than 150 µm during the illumination cycle of the light-emitting diode 54 because the vibration of the light guide rod 3 follows a sine wave.) When the diameter of the light guide rod 3 is 600 µm, the light-emitting diode 54 is illuminated four times while the light guide rod 3 is moved by 600 µm. In this case, an afterimage of visible light emitted from the distal end 3a of the light guide rod 3 is not viewed as being flickering.

The sixth embodiment may be modified in the following ways.

It is preferable that the analog signal processing circuit 41 perform analog processing. However, the voltage signal output from the sample-hold circuit 191 may be subjected to digital processing with a microcomputer.

An infrared light detection device 1 according to a seventh embodiment of the present invention will now be described focusing on its differences from the first embodiment.

A controller 70 may be a one-chip microcomputer including an A/D converter, a CPU 70a for executing various arithmetic operations, a ROM for storing various control programs, a RAM for storing various data, and a counter (8-bit counter) 70b.

The controller 70 detects the width d1 of an incident light flux 90 (diameter of the cross-section of the incident light flux 90 on the XY plane) by performing scanning with a light guide rod 3. The controller 70 performs automatic tracking of the light flux and automatic adjustment of the scan speed. In the light flux automatic tracking, a stepping motor 21 is controlled so that the light guide rod 3 is moved in the X-direction by a scan distance corresponding to the width d1. In the scan speed automatic adjustment, the stepping motor 21 is controlled so that the light guide rod 3 is moved in the X-direction at a speed corresponding to the width d1.

The relationship between the width d1 of the incident light flux 90 and the scan speed of the light guide rod 3 in the X-direction will now be described. The infrared light detection device 1 vibrates the light guide rod 3 in the Y-direction and the X-direction in a manner that the operator is able to visually identify the incident light flux 90 of invisible light, such as infrared light, as an afterimage 90a of visible light.

Figure 42:
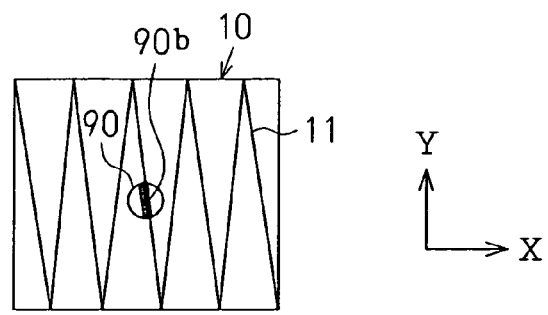
FIG. 42 is a diagram describing detection of an incident light flux having a small diameter.

As shown in FIG. 42, when the width d1 of the incident light flux 90 is much smaller than the light detection area 10 of the light guide rod 3 and the scan speed of the light guide rod 3 in the X-direction is high, the distal end 3a of the light guide rod 3 crosses the incident light flux 90 only once or only several times during scanning of the light guide rod 3 in the X-direction. In this case, visible light output from the distal end 3a of the light guide rod 3 is viewed by the operator as a linear afterimage 90b, which differs from the actual cross-sectional shape of the incident light flux 90.

Lowering the scan speed of the light guide rod 3 in the X-direction causes the scan lines 11 to be denser in the X-direction. Thus, lowering the scan speed of the light guide rod 3 in the X-direction improves the detection resolution. As a result, the incident light flux 90 having a circular cross-section with a small diameter is displayed as a circular afterimage.

For example, the vibration frequency of the light guide rod 3 in the Y-direction is 100 Hz in the seventh embodiment. The scan time required by the distal end 3a to move one way in the Y-direction is 5 msec. When the scan time (scan time for one frame) required by the light guide rod 3 to perform scanning in the X-direction is 210 msec, the light guide rod 3 vibrates 42 times in the Y-direction during the scan time. In other words, the number of scan lines 11 in the X-direction is 42 in this case. The width of the light detection area 10 in the X-direction (maximum scan width) is 15 mm. Thus, the pitch between the scan lines 11 is calculated as 0.35 mm. When the diameter of the incident light flux 90 is Ø1 mm, two or three scan lines 11 cross the incident light flux 90.

It is known from human sensory tests that an afterimage typically fades after about 200 msec. This means that the operator is unable to visually identify the incident light flux 90 having a small width d1 as an afterimage when the scan time for one frame in the X-direction is too long.

To overcome this problem, the controller 70 in the infrared light detection device 1 of the seventh embodiment adjusts the scan width and the scan speed in the X-direction.

The light flux automatic tracking and the scan speed automatic adjustment will now be described with reference to Table 2.

TABLE 2

| Class | Light Flux Width d1 (mm) | Scan Pulse Number | Pulse Rate (msec) Table Setting Value | Scan Time for One Frame (msec) | Scan Line Number | Scan Line Pitch (mm) |
|---|---|---|---|---|---|---|
| 1 | 0–1.5 | 15 | 2.4 | 36 | 7.2 | 0.2 |
| 2 | 1.6–3.1 | 31 | 2.2 | 68.2 | 13.6 | 0.2 |
| 3 | 3.2–4.7 | 47 | 2.0 | 94 | 18.8 | 0.3 |
| 4 | 4.8–6.3 | 63 | 1.8 | 113.4 | 22.7 | 0.3 |
| 5 | 6.4–7.9 | 79 | 1.6 | 126.4 | 25.3 | 0.3 |
| 6 | 8.0–9.5 | 95 | 1.4 | 133 | 26.6 | 0.4 |
| 7 | 9.6–11.1 | 110 | 1.3 | 143 | 28.6 | 0.4 |
| 8 | 11.2–12.7 | 127 | 1.2 | 152.4 | 30.5 | 0.4 |
| 9 | 12.8–14.3 | 143 | 1.2 | 171.6 | 34.3 | 0.4 |
| 10 | 14.4–15.0 | 150 | 1.1 | 165 | 33 | 0.5 |

Table 2 shows the width d1 of the incident light flux 90 detected by the controller 70 (detected light flux width), the scan speed of the light guide rod 3 in the X-direction calculated by the controller 70 based on the width d1 (scan time for one frame), the number of scan lines 11, and the pitch of scan lines 11 (detection resolution).

The stepping motor 21 moves its slider 81 by 0.1 mm (fixed amount) whenever receiving a single-pulse input signal (single scan pulse). The single-step driving of the stepping motor 21 causes the light guide rod 3 to move by 0.1 mm. The width of the light detection area 10 in the X-direction is 15 mm. To perform scanning of the entire light detection area 10 in the X-direction, the stepping motor 21 needs to be provided with an input signal having 150 pulses.

In Table 2, the "scan pulse number" is the number of pulses of the input signal provided to the stepping motor 21 while the controller 70 is being provided with the detected light signal (output current) from the photo-detector 53. The scan pulse number is counted by the 8-bit counter 70b included in the controller 70. For example, when the scan pulse number is 15, the detected light flux width is 1.5 mm (15×0.1 mm). When the scan pulse number is 31, the detected light flux width is 3.1 mm (31×0.1 mm).

The distance by which the stepping motor 21 is moved by single-step driving is 0.1 mm. The width of the light detection area 10 in the X-direction is 15 mm. Thus, the count value of the 8-bit counter 70b is from 0 to 150. Here, the drive speed of the stepping motor 21 may be changed among 150 levels according to the width d1 of the incident light flux 90. However, the count number is compressed to be expressed using only the upper four rank bits of the 8-bit counter 70b in the seventh embodiment. The drive speed of the stepping motor 21 is changed in ten levels in the seventh embodiment.

More specifically, the detected light flux width is classified into ten stages shown in Table 2. Ten pulse rates 2.4 to 1.1 are set for the ten stages of the detected light flux width. For example, when the width d1 of the incident light flux 90 is classified into class 1 (0 to 1.5 mm), the pulse rate is set at 2.4. When the width d1 of the incident light flux 90 is classified into class 2 (1.6 to 3.1 mm), the pulse rate is set at 2.2.

The "scan pulse number" is the maximum value of the number of pulses converted from the detected light flux width. For example, the scan pulse number of 15 is a value obtained by conversion to the number of pulses at the detected light flux width of 1.5 mm, which is the maximum value in the detected light flux width range of 0 to 1.5 mm. The scan pulse number of 31 is a value obtained by converting the detected light flux width of 3.1 mm, which is the maximum value in the detected light flux width range of 1.6 to 3.1 mm, into the number of pulses.

The "pulse rate" relates to the drive speed of the stepping motor 21, that is, the detection resolution. For example, when the width d1 of the incident light flux 90 is classified into class 1, the pulse rate is 2.4 msec. In this case, the stepping motor 21 moves the light guide rod 3 by 0.1 mm after every 2.4 msec. When the width d1 of the incident light flux 90 is classified into class 2, the stepping motor 21 moves the light guide rod 3 by 0.1 mm after every 2.2 msec. Based on experiments using various light fluxes 90 varying in their width d1, the values of the pulse rate are set to enable an afterimage of visible light to be viewed as a circular afterimage. The experimental results show that a change in the pulse rate (change in the speed) is less influential as the width d1 of the incident light flux 90 decreases. To reflect this finding, values of the pulse rate for various values of the width d1 are set so that the pulse rate changes by a greater amount as the width d1 decreases. These values of the pulse rate set in the ten stages are stored in the controller 70 as the table setting values.

The "scan time for one frame" is the time required to form one screen, that is, the time required to move the distal end 3a of the light guide rod 3 in the X-direction and the Y-direction and form one frame corresponding to one XY scan area. The scan time for one frame is calculated by multiplying the scan pulse number by the pulse rate. For example, when the width d1 is classified into class 1, the scan time for one frame (36 msec) is obtained by multiplying the scan pulse number (15) by the pulse rate (2.4 msec). When the width d1 is classified into class 2, the scan time for one frame (68.2 msec) is obtained by multiplying the scan pulse number (31) by the pulse rate (2.2 msec).

The "scan line number" is the number of scan lines generated in the above one frame. The scan line number is calculated by dividing the scan time for one frame by $\frac{1}{200}$ (Hz), that is, by dividing the scan time for one frame by 5 (msec). For example, when the width d1 of the incident light flux 90 is classified into class 1, the scan time for one frame is 36 msec and the scan line number is 7.2. When the width d1 is classified into class 2, the scan time for one frame is 68.2 msec and the scan line number is about 13.6.

The "scan line pitch" refers to the scan interval. The scan line pitch is calculated by dividing the detected light flux width by the scan line number. For example, when the width d1 of the incident light flux 90 is classified into class 1, the detected light flux width is 1.5 mm and the scan line number is 7.2 mm, so that the scan line pitch is about 0.2 mm.

The scan line number and the scan line pitch in Table 2 each show values rounded off to the nearest one-tenth.

Figure 43:
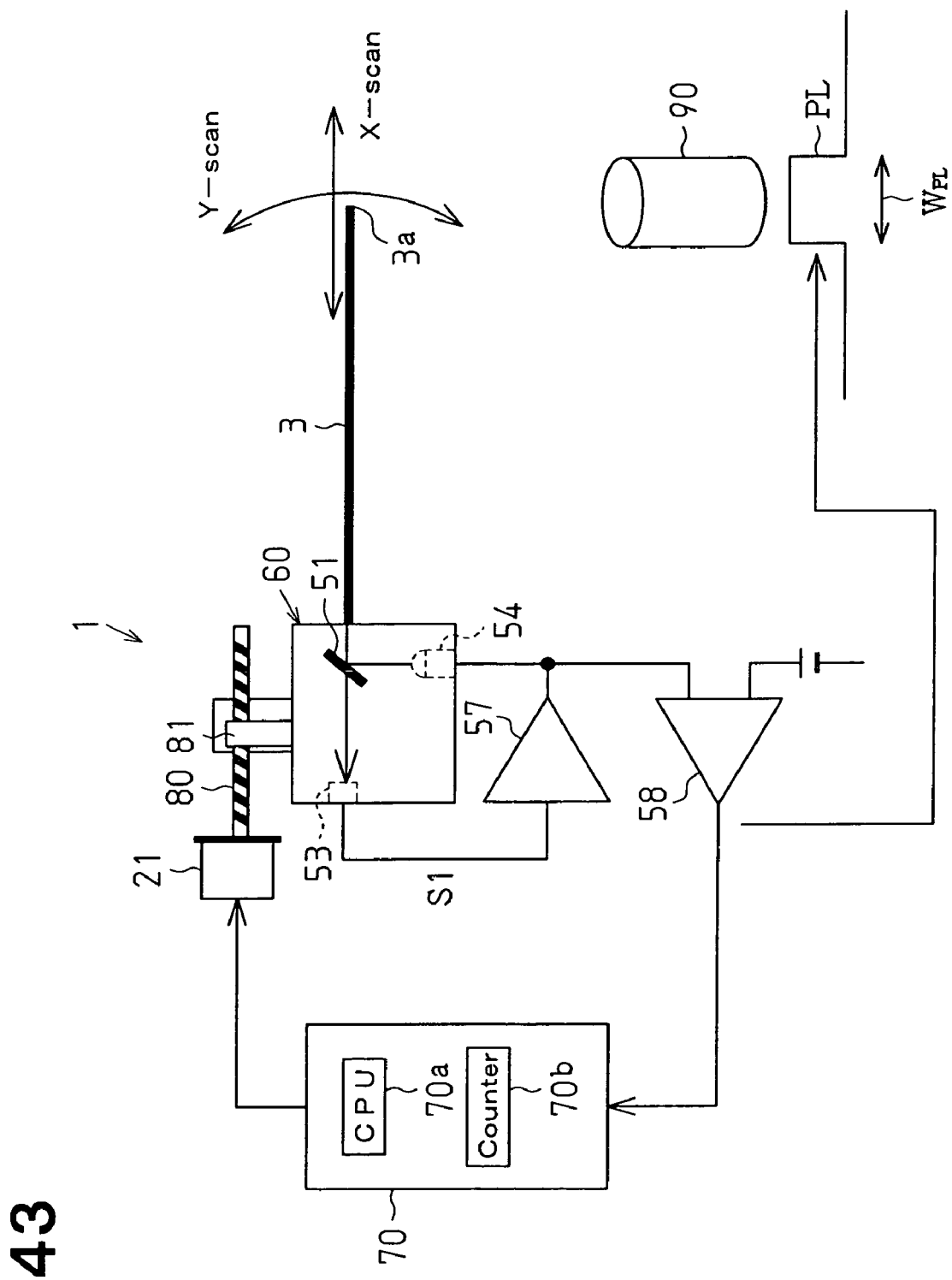
FIG. 43 is a block diagram of an infrared light detection device according to a seventh embodiment of the present invention.

As shown in FIG. 43, the controller 70 monitors the detected light signal of the photo-detector 53 while controlling the driving of the stepping motor 21.

The detected light signal of the photo-detector 53 is amplified by an amplifier 57, which is included in the analog signal processing circuit 41. The amplified detected light signal drives the light-emitting diode 54. As a result, the light-emitting diode 54 emits visible light. A comparator 58 included in the analog signal processing circuit 41 converts the amplified detected light signal into a logical signal and provides the controller 70 with the logical signal.

When the incident light flux 90 enters the distal end 3a, the comparator 58 provides the controller 70 with a high (H) level logical signal indicating that the incident light flux 90 is being detected. When the incident light flux 90 is not incident on the distal end 3a, the comparator 58 provides the controller 70 with a low (L) level logical signal.

The controller 70 performs light flux automatic tracking in accordance with the logical signal. In detail, the controller 70 determines that the incident light flux 90 is being detected when receiving an H level logical signal. The controller 70 determines that the incident light flux 90 is not being detected when receiving an L level logical signal. The controller 70 switches between forward rotation and reverse rotation of the stepping motor 21 in accordance with the logical signal. As a result, the distal end 3a of the light guide rod 3 is moved within an area in which the incident light flux 90 is detected (light flux width area). The light flux automatic tracking is hereafter referred to as "light flux width limiting scan".

In FIG. 43, the width WPL of a pulse PL is a light flux width area in the X-direction when the controller 70 performs the light flux width limiting scan.

The controller 70 calculates the width d1 of the incident light flux 90 based on the logical signal provided from the comparator 58 and the number of motor drive pulses (scan pulse number) of the stepping motor 21. In addition to the light flux automatic tracking, the controller 70 performs the scan speed automatic adjustment of the scan speed (pulse rate) in the X-direction in accordance with the calculated width d1.

In the scan speed automatic adjustment, the controller 70 counts the number of pulses (scan pulse number) provided to the stepping motor 21 while receiving the detected light signal (output current) of the photo-detector 53 using the 8-bit counter 70b. A comparator (not shown) included in the controller 70 compares the counted pulse number and the scan pulse number (Table 2) in accordance with the width d1 of the incident light flux 90 and compresses the counted pulse number to be expressed using the upper four rank bits of the 8-bit counter 70b. In other words, the controller 70 determines the class of the width d1 of the incident light flux 90 based on the pulse number representing the detected light flux width.

For example, when the width d1 of the incident light flux 90 is classified into class 1 and the count value of the 8-bit counter 70b is less than or equal to the scan pulse number of 15, the controller 70 converts the count value into a value expressed using four bits "0001". In other words, when the detected light flux width of the incident light flux 90 is in a range of 0 to 1.5 mm and the pulse number counted by the 8-bit counter 70b is in a range of 0 to 15, the controller 70 expresses the pulse number representing the detected light flux width using the four bits "0001".

When the detected light flux width is in a range of 1.6 to 3.1 mm, the width d1 of the incident light flux 90 is classified into class 2, and the count value of the 8-bit counter 70b is less than or equal to the scan pulse number of 31, the controller 70 expresses the pulse number representing the detected light flux width using the four bits "0010". In the same manner, when the detected light flux width is in a range of 14.4 to 15.0 mm, the width d1 of the incident light flux 90 is classified into class 10, and the count value of the 8-bit counter 70b is less than or equal to the scan pulse number of 150, the controller 70 expresses the pulse number "1010" representing the detected light flux width using the four bits.

In this way, when converting the detected light flux width of the incident light flux 90 into the number of pulses to be provided to the stepping motor 21, the controller 70 expresses the pulse number representing the detected light flux width in the ten stages "1" to "10" shown in Table 2. Based on the pulse number expressed using four bits, the controller 70 sets the table setting value of the pulse rate (scan speed in the X-direction) shown in Table 2 by referring to the pulse rate setting table stored in the ROM. The controller 70 then drives the stepping motor 21 at the set pulse rate.

For example, when the pulse number into which the detected light flux width is converted is "0001", the controller 70 sets the pulse rate at 2.4 msec by referring to the pulse rate setting table. When the pulse number is "0010", the controller 70 sets the pulse rate at 2.2 msec by referring to the pulse rate setting table. In the same manner, when the pulse number is "1010", the controller 70 sets the pulse rate at 1.1 msec by referring to the pulse rate setting table.

The light flux automatic tracking and the scan speed automatic adjustment will now be described with reference to the flowchart shown in FIG. 44. In the flowchart, the "step number" is the same as the number of pulses provided to the stepping motor 21.

Figure 40A:
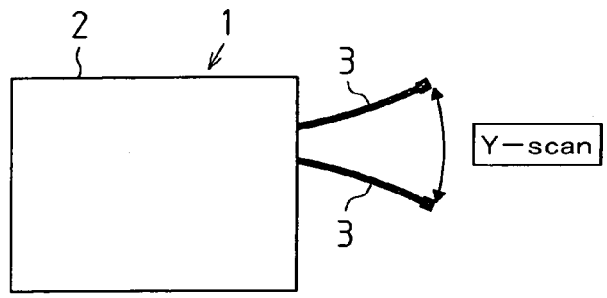
FIGS. 40(a) and 40(b) are diagrams describing Y-scan and X-scan.
Figure 40B:
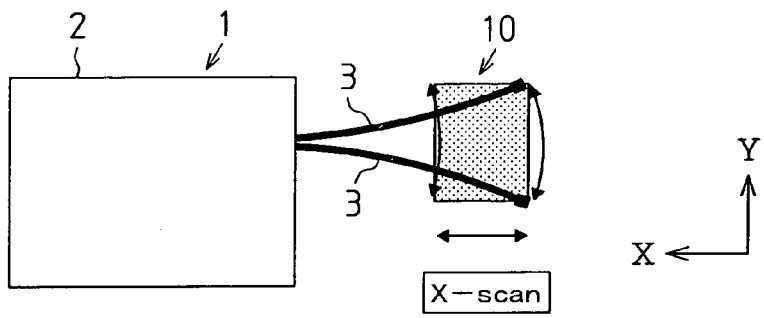
Figure 41:
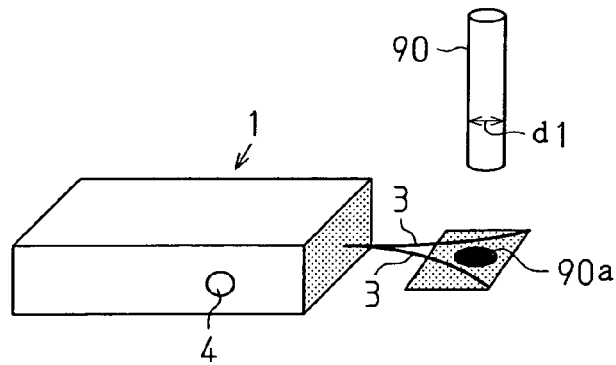
FIG. 41 is a diagram describing an afterimage of visible light.
Figure 44:
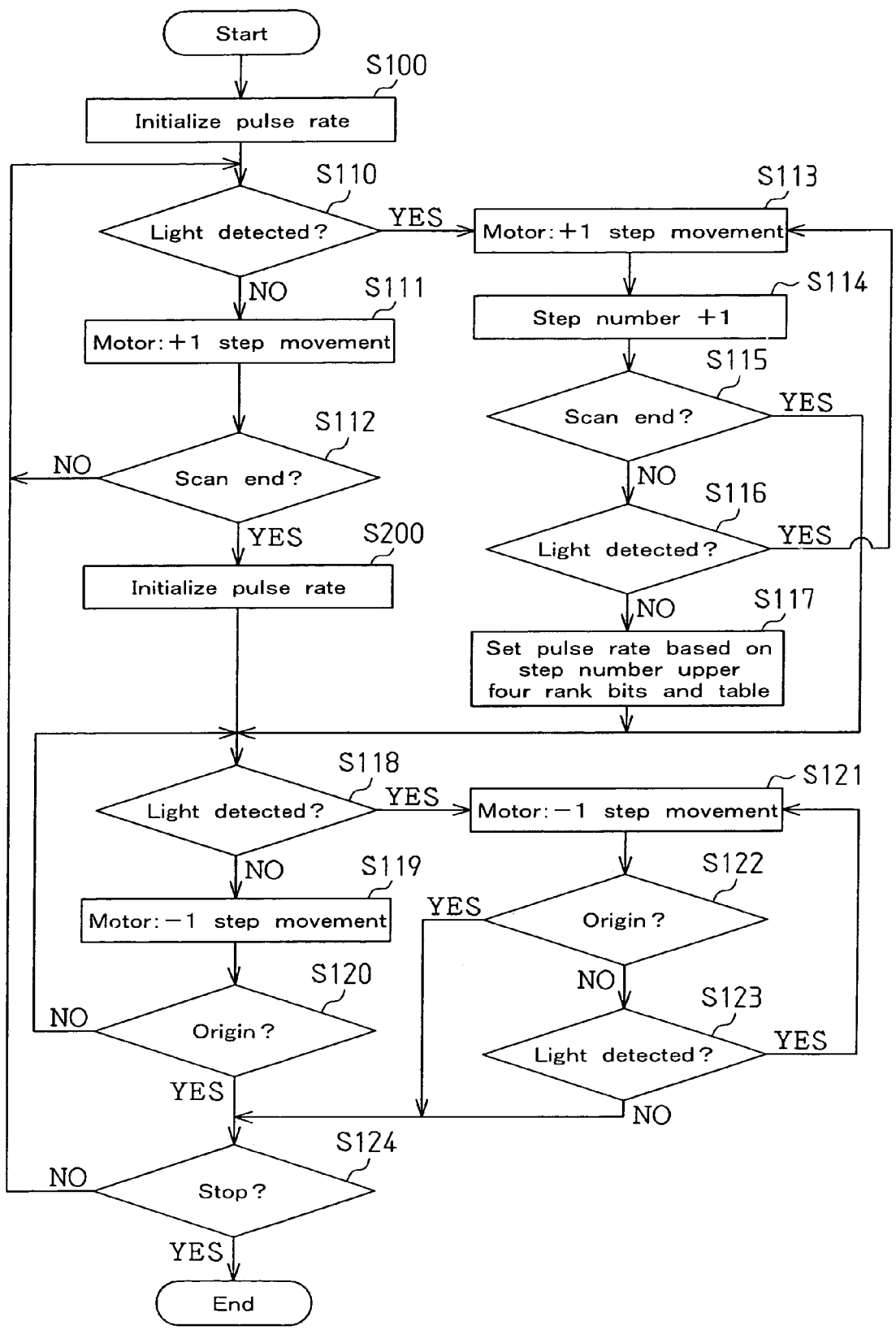
FIG. 44 is a flowchart showing automatic tracking of the light flux and automatic adjustment of the scan speed, which are performed by the controller shown in FIG. 43.

The CPU 70a of the controller 70 executes the routine of FIG. 44 after every single reciprocating motion of the light guide rod 3 in the X-direction. Referring to FIG. 40(*a*), when the distal end 3a is located at the position of the origin in the X-direction (X=0), the light guide rod 3 is retracted the most into the main body 2. Referring to FIG. 40(*b*), when the distal end 3a is located at the position of the scan end, the light guide rod 3 is projected the most from the main body 2. The origin and the scan end may be opposite to each other.

(1) When the Incident Light Flux 90 is Detected

The operator pushes the switch 4 while the light guide rod 3 is stopped so that the process shown in FIG. 44 is started. First, in step S100, the CPU 70a sets the pulse rate of the stepping motor 21 to a predetermined initial scan speed. The initial scan speed may be, for example, the pulse rate of 1.1 msec corresponding to the maximum light flux detection width of 15.0 mm.

In step S110, the CPU 70a determines whether the incident light flux 90 has entered the distal end 3a of the light guide rod 3 based on the detected light signal of the photo-detector 53.

When the incident light flux 90 is not detected (NO in step S110), the CPU 70a drives the stepping motor 21 to move in the positive direction by a distance corresponding to one step in step S111. As a result, the stepping motor 21 rotates in the forward direction at the initial scan speed so that the light guide rod 3 is moved away from the origin. When a predetermined time elapses after the switch 4 is pushed, the drive coil 31 starts the vibration of the light guide rod 3 in the Y-direction.

In step S112, the CPU 70a determines whether the light guide rod 3 has reached the scan end. When the light guide rod 3 has not reached the scan end (NO), the processing returns to step S110. The CPU 70a repeats the processing in steps S110 to S112 until the incident light flux 90 is detected. Whenever the CPU 70a performs the processing in steps S110 to S112, the stepping motor 21 is rotated in the forward direction by a distance corresponding to one step and the light guide rod 3 is moved in the X-direction by a distance corresponding to one step, that is, a distance of 0.1 mm, from the origin side toward the scan end side.

When the incident light flux 90 is detected (YES in step S110), the 8-bit counter 70*b* starts counting the number of pulses. The 8-bit counter 70*b* stops counting the pulse number when the incident light flux 90 stops being detected (when the light signal stops being detected).

In step S113, the CPU 70*a* moves the stepping motor 21 in the positive direction by a distance corresponding to one step (+1 step movement). The forward rotation of the stepping motor 21 moves the light guide rod 3 in the X-direction toward the scan end side.

In step S114, the CPU 70*a* adds one to the pulse number counted by the 8-bit counter 70*b*.

In step S115, the CPU 70*a* determines whether the distal end 3*a* of the light guide rod 3 has reached the scan end.

When the distal end 3*a* has not reached the scan end (NO in S115), the CPU 70*a* determines whether the incident light flux 90 is being detected in step S116. When the incident light flux 90 is being detected (YES), the processing returns to step S113.

The processing of steps S113 to S116 is repeated. The 8-bit counter 70*b*, which starts counting the pulse number when the incident light flux 90 starts being detected, continues counting the pulse number until the incident light flux 90 stops being detected.

When the incident light flux 90 stops being detected (NO in S116), the CPU 70*a* sets the scan speed in the X-direction (pulse rate) based on the upper four rank bits of the step number and the pulse rate setting table in step S117.

By performing the processing in steps S110 to S117, the CPU 70*a* calculates the width d1 of the incident light flux 90. The CPU 70*a* performs the scan speed automatic adjustment of setting the scan speed (pulse rate) in the X-direction in accordance with the width d1.

For example, when the pulse number counted by the 8-bit counter 70*b* is in the range of 0 to 15 and is expressed using the pulse number "0001" representing the detected light flux width of the incident light flux 90, the table setting value corresponding to the width d1 of class 1, that is, 2.4 msec, is set as the pulse rate. When the pulse number is in a range of 16 to 31 and is expressed using the pulse number "0010" representing the detected light flux width of the incident light flux 90, the table setting value corresponding to the width d1 of class 2, that is, 2.2 msec, is set as the pulse rate.

After the pulse rate is set in step S117, the CPU 70*a* again determines whether the incident light flux 90 is detected in step S118. When the incident light flux 90 is not detected immediately after the pulse rate is set (NO in step S118), the CPU 70*a* moves the stepping motor 21 in the negative direction by a distance corresponding to one step in step S119 (−1 step movement). As a result, the stepping motor 21 starts rotating in the reverse direction, so that the light guide rod 3 is moved toward the origin in the X-direction at the scan speed set in step S117.

In step S120, the CPU 70*a* determines whether the light guide rod 3 has reached the origin. If the light guide rod 3 has not reached the origin immediately after the start of the reverse rotation of the stepping motor 21 (NO in step S120), the processing returns to step S118.

The CPU 70*a* repeats the processing in steps S118 to S120 and the reverse rotation of the stepping motor 21 is continued until the incident light flux 90 is detected. During this period, the stepping motor 21 rotates in the reverse direction at the optimum pulse rate set in step S117, and the light guide rod 3 is moved toward the origin in the X-direction.

When the incident light flux 90 is detected during the reverse rotation of the stepping motor 21 (YES in step S118), the CPU 70*a* repeats the processing of steps S121 to S123 and continues the reverse rotation of the stepping motor 21 until the incident light flux 90 stops being detected.

When the incident light flux 90 stops being detected (NO in step S123), the CPU 70*a* determines whether the operator has operated the switch 4 to stop the stepping motor 21 in step S124. When the switch 4 has been operated (YES in step S124), the CPU 70*a* stops the stepping motor 21, and stops the scanning of the light guide rod 3 in the X-direction. The CPU 70*a* also stops the vibration (scanning) of the light guide rod 3 in the Y-direction. When the switch 4 has not been operated (NO in step S124), the processing returns to step S110.

(2) When the incident light flux 90 is not detected When the incident light flux 90 is off the light detection area 10 (NO in step S110), the CPU 70*a* moves the stepping motor 21 in the positive direction by a distance corresponding to one step in step S111 (+1 step movement). As a result, the stepping motor 21 starts rotating in the forward direction so that the light guide rod 3 starts moving away from the origin.

In step S112, the CPU 70*a* determines whether the light guide rod 3 has reached the scan end. If the light guide rod 3 has not reached the scan end (NO in step S112), the processing returns to step S110. The CPU 70*a* continues the forward rotation of the stepping motor 21 and the light guide rod 3 is moved toward the scan end in the X-direction until the light guide rod 3 reaches the scan end.

When the light guide rod 3 has reached the scan end (YES in step S112), the CPU 70*a* sets the pulse rate of the stepping motor 21 to a predetermined initial scan speed in step S200. The initial scan speed is, for example, a pulse rate of 1.1 msec corresponding to the maximum light flux detection width of 15.0 mm.

When the incident light flux 90 is not detected in step S118 (NO in step S118), the CPU 70*a* starts reverse rotation of the stepping motor 21 in step S119.

In step S120, the CPU 70*a* determines whether the light guide rod 3 has reached the origin. When the light guide rod 3 has not reached the origin immediately after the start of the reverse rotation (NO), the processing returns to step S118. The CPU 70*a* continues the reverse rotation of the stepping motor 21 until the light guide rod 3 reaches the origin.

When the light guide rod 3 has reached the origin (YES in step S120), the CPU 70*a* determines whether the operator has operated the switch 4 to stop the stepping motor 21 in step S124. When the switch 4 is operated (YES in step S124), the CPU 70*a* stops the stepping motor 21, and stops the scanning of the light guide rod 3 in the X-direction. The CPU 70*a* also stops the vibration (scanning) of the light guide rod 3 in the Y-direction. When the switch 4 is not been operated (NO in step S124), the processing returns to step S110.

The routine of FIG. 44 enables the distal end 3*a* of the light guide rod 3 to reciprocate in the X-direction within the light flux width area included in the light detection area 10 while being vibrated in the Y-direction.

In addition to the advantages of the first embodiment, the seventh embodiment has the advantages described below.

The controller 70 detects the width d1 of the incident light flux 90. According to the detected width d1, the controller 70 reduces the distance by which the light guide rod 3 is moved in the X-direction. This shortens the scan time of the light guide rod 3 so that the operator is able to visually identify an afterimage of visible light output from the distal end 3*a* of the light guide rod 3. The operator is able to visually identify the incident light flux 90 having a small width d1 as an afterimage of visible light with high resolution. As a result, the operator is able to easily identify the position of the incident light flux 90 having a small width d1.

Even when the incident light flux 90 or the infrared light detection device 1 is moved, the infrared light detection device 1 automatically tracks the incident light flux 90 as long as the incident light flux 90 is in the light detection area 10. Thus, the operator using the infrared light detection device 1 is able to easily detect the optical path position of invisible light such as infrared light.

The controller 70 detects the width d1 of the incident light flux 90 in the X-direction and drives the stepping motor 21 at the speed set according to the detected width d1. With the combined effect of this scan speed adjustment and the adjustment of the move distance of the light guide rod 3, the scan speed of the light guide rod 3 is lowered sufficiently. As a result, the scan line pitch is reduced and the display resolution is further improved.

The scanning of an area that is limited in accordance with the width d1 of the incident light flux 90 is performed automatically without requiring the operator to perform any burdensome operation. In this respect, the infrared light detection device 1 is easy to use.

The pulse rate of the stepping motor 21 is set at a larger value as the width d1 of the incident light flux 90 is smaller. With the pulse rate set at a larger value, the scanning in the X-direction is performed at a lower speed (refer to Table 2). Further, when the width d1 of the incident light flux 90 is small, the distance by which the light guide rod 3 is moved in the X-direction is set according to the width d1. Thus, the infrared light detection device 1 displays invisible light as an afterimage of visible light with high resolution.

When the width d1 of the incident light flux 90 is converted into the count value of the 8-bit counter 70b, the pulse number is compressed to be expressed using the upper four rank bits of the 8-bit counter 70b. Values of the width d1 of the incident light flux 90 are classified into a plurality of classes (10 classes) that are expressed using four bits. This simplifies arithmetic operations required to set the scan speed (pulse rate) in accordance with the detected light flux width. Such simplified arithmetic operations are executed at high speeds.

The width d1 of the incident light flux 90 is detected for every reciprocating motion of the light guide rod 3 in the X-direction. This enables change in the position of the infrared light flux to be instantaneously detected.

The width d1 of the incident light flux 90 is detected and the pulse rate is set (correction pulse rate is calculated) when the light guide rod 3 moves forth in the X-direction. Then, when the light guide rod 3 moves back in the X-direction, the stepping motor 21 is driven in the reverse rotation at the pulse rate set during the forth way movement of the light guide rod 3. Thus, the infrared light detection device 1 shows an afterimage of visible light with high display resolution even if the incident light flux 90 has a small width d1.

It should be apparent to those skilled in the art that the present invention may be embodied in many other specific forms without departing from the spirit or scope of the invention. Particularly, it should be understood that the present invention may be embodied in the following forms.

The switch 4 does not have to be a push switch and may be another type of switch, such as a rotary switch.

The light guide rod 3 may have a hollow structure. This significantly enlarges the usable wavelength region.

The light guide rod 3 may be made of transparent resin.

A linear stepping motor may be used instead of the X-direction drive system that includes the screw-operated slider and the stepping motor 21.

The gold reflection film 100 formed on the polished surface 3c of the light guide rod 3 may be a highly reflective reflection film that is made of metal other than gold.

The gold reflection film 100 may be metal foil bonded to the polished surface 3c or metal powder coated on the polished surface 3c.

The switch 4 in the seventh embodiment is operated when the controller 70 starts the light flux automatic tracking and the scan speed automatic adjustment. However, the switch 4 may also be operated to desirably switch the scan speed of the light guide rod 3 in the X-direction as in the first embodiment.

The various numerical values described in the seventh embodiment are mere examples. These numerical values may be changed. For example, the stepping motor 21 may move the light guide rod 3 to vibrate in the X-direction by 0.1 mm (fixed amount) using the slider 81 fixed to the module 60 every time when one pulse is input in the seventh embodiment. Alternatively, the stepping motor may move the light guide rod 3 by any fixed amount other than 0.1 mm every time when one pulse is input.

The present examples and embodiments are to be considered as illustrative and not restrictive, and the invention is not to be limited to the details given herein, but may be modified within the scope and equivalence of the appended claims.

What is claimed is:

1. A light detection device for detecting detected light, the light detection device comprising:
   a main body;
   a light guide supported by the main body in a manner enabling the light guide to vibrate, the light guide including a distal end projecting from one side surface of the main body, wherein the distal end functions as a light incident portion through which the detected light enters and a light radiation portion from which visible light is emitted;
   a drive mechanism, arranged in the main body, for reciprocating the light guide in an X-direction while vibrating the light guide in a Y-direction that is perpendicular to the X-direction, wherein the distal end of the light guide moves within a light detection area in an XY plane; and
   a visible light-emitting unit, arranged in the main body, for emitting visible light from the distal end of the light guide when the detected light enters the distal end, wherein the visible light-emitting unit includes;
   a photo-detector, optically coupled to the light guide, for detecting the detected light from the light guide; and
   a light-emitting element for generating the visible light when the photo-detector detects the detected light.

2. The light detection device according to claim 1, wherein:
   the light guide is a glass rod having a basal end and an inclined polished surface formed on the distal end; and
   the polished surface reflects the detected light so that the detected light is directed into the light guide and reflects the visible light so that the visible light from the light-emitting element entering the basal end of the light guide is emitted from the light guide.

3. The light detection device according to claim 1, wherein the light guide has a basal end fixed to the main body, and the distal end swings with the basal end functioning as a fulcrum.

4. The light detection device according to claim 1, wherein the drive mechanism includes:
   an electromagnetic Y-direction drive mechanism for vibrating the light guide in the Y-direction; and
   an X-direction drive mechanism for reciprocating the light guide in the X-direction.

5. The light detection device according to claim 4, wherein the X-direction drive mechanism includes a rotary stepping motor, and a screw mechanism for converting rotation of the stepping motor into linear movement and transmitting the linear movement to the light guide.

6. The light detection device according to claim 4, wherein the light guide includes a basal end and the visible light-emitting unit includes:
   an optical system for having detected light emitted from the basal end of the light guide enter the photo-detector and for having the visible light emitted from the light-emitting element enter the basal end; and
   a light detection circuit, connected to the photo-detector and the light-emitting element, for illuminating the light-emitting element in accordance with a detection signal output from the photo-detector when the detected light is received.

7. The light detection device according to claim 6, wherein the optical system and the light detection circuit are integrated into a single module, and the X-direction drive mechanism integrally reciprocates the module and the light guide in the X-direction.

8. The light detection device according to claim 6, further comprising:
   two bases holding the basal end of the light guide therebetween, wherein one of the bases is fixed to an optical system substrate holding the optical system and the other one of the bases is fixed to a circuit board holding the light detection circuit.

9. The light detection device according to claim 1, wherein the drive mechanism and the visible light-emitting unit are accommodated in the main body, and the main body includes a lid removably held by a magnet.

10. The light detection device according to claim 1, wherein the distal end of the light guide includes a polished surface that has undergone a light reflection process.

11. The light detection device according to claim 10, wherein the light reflection process is a process for forming a metal reflection film.

12. The light detection device according to claim 10, wherein the light guide includes a chamfered portion that is formed around the polished surface.

13. The light detection device according to claim 1, wherein the light-emitting element generates visible light having a peak wavelength in a range of 590 to 620 nm.

14. The light detection device according to claim 1, wherein the light-emitting element is a white light-emitting diode.

15. The light detection device according to claim 4, further comprising:
   an adjustment unit for adjusting a vibration direction of the light guide to prevent the light guide from vibrating in a direction diagonal to the Y-direction.

16. The light detection device according to claim 15, wherein:
   the light guide has a basal end fixed to the main body, and the distal end swings with the basal end serving as a fulcrum;
   the Y-direction drive mechanism includes a first permanent magnet fixed to the light guide, with the first permanent magnet having magnetic poles arranged in the Y direction, and two coils respectively facing a north pole and a south pole of the first permanent magnet; and
   the adjustment unit includes a second permanent magnet having magnetic poles, wherein the second permanent magnet is arranged so that each magnetic pole of the second permanent magnet faces the same magnetic pole of the first permanent magnet.

17. The light detection device according to claim 16, wherein the second permanent magnet is movable in the Y-direction.

18. The light detection device according to claim 16, wherein the second permanent magnet magnetically applies force to the first permanent magnet in a Z-direction that is perpendicular to the XY plane.

19. The light detection device according to claim 1, wherein the light guide has a basal end and the light receiving element has a light-receiving surface optically and directly coupled to the basal end of the light guide, and the photo-detector reflects the visible light emitted from the light-emitting element with the light-receiving surface and directs the visible light to the basal end of the light guide.

20. The light detection device according to claim 19, wherein:
   the photo-detector outputs a detected light signal in accordance with the received detected light;
   the visible light-emitting unit includes a light detection circuit for illuminating the light-emitting element in accordance with the detected light signal;
   the light detection circuit samples the detected light signal and drives the light-emitting element in accordance with the sampled detected light signal, the light detection circuit performing the sampling and the driving of the light-emitting element in a time sharing manner.

21. The light detection device according to claim 20, wherein the light detection circuit includes:
   a sample-hold circuit for sampling the detected light signal and generating an output signal;
   a driver for driving the light-emitting element with the output signal of the sample-hold circuit; and
   a control circuit for controlling the sample-hold circuit and the driver to alternately perform the sampling and the driving of the light-emitting element.

22. The light detection device according to claim 21, wherein:
   the sample-hold circuit is controlled by the control circuit to alternately repeat a sampling operation and an output operation in predetermined cycles, wherein the sampling operation samples the detected light signal for a fixed period of time, converts the sampled detected light signal into a voltage signal, and holds the voltage signal, and the output operation outputs the held voltage signal; and
   the driver is controlled by the control circuit to drive the light-emitting element during the output operation of the sample-hold circuit.

23. The light detection device according to claim 6, wherein the detected light forms a light flux with a cross-section having a dimension in the X-direction, the light detection device further comprising:
a controller, connected to the light detection circuit, for calculating the dimension of the light flux based on the detection signal and controlling the X-direction drive mechanism to move the light guide in the X-direction by an amount that is adjusted in accordance with the calculated dimension.

24. The light detection device according to claim 23, wherein the controller controls the X-direction drive mechanism so that the light guide is moved in the X-direction at a scan speed set that is in accordance with the dimension.

25. The light detection device according to claim 24, wherein:
the X-direction drive mechanism includes a stepping motor for moving the light guide in the X-direction by a fixed amount whenever one pulse is input; and
the controller counts the number of pulses provided to the stepping motor during a period in which the distal end of the light guide is traversing the light flux of the detected light, and increases pulse rate of the stepping motor for a lesser counted number of pulses.

26. The light detection device according to claim 25, wherein the controller includes an n-bit counter for counting the number of pulses, the dimension is classified into one of a plurality of classes, and the number of the plurality of classes is less than or equal to a number expressed using upper four rank bits of the n-bit counter.

27. The light detection device according to claim 23, wherein the controller detects the dimension whenever the X-direction drive mechanism performs a reciprocating scan motion of the light guide in the X-direction.

28. The light detection device according to claim 25, wherein the light guide is scanned in the X-direction between two scan ends, during a scan from one of the scan ends to the other one of the scan ends, the controller drives the stepping motor to produce rotation in a forward direction at one speed while detecting the dimension and calculating a correction speed of the stepping motor, and during a scan from the other one of the scan ends to the other one of the scan ends, the controller drives the stepping motor to produce rotation in a reverse direction at a corrected speed.

29. The light detection device according to claim 1, wherein the light guide is a flexible glass fiber.

30. The light detection device according to claim 1, wherein the main body is handheld size.

* * * * *